United States Patent [19]

Takahashi et al.

[11] Patent Number: 5,610,939
[45] Date of Patent: Mar. 11, 1997

[54] SIGNAL PROCESSING CIRCUIT FOR SPREAD SPECTRUM COMMUNICATIONS

[75] Inventors: Kenichi Takahashi; Minako Takeishi, both of Kawasaki; Hiroshi Onishi, Tokyo, all of Japan

[73] Assignee: Matsushita Electric Industrial Co., Ltd., Osaka, Japan

[21] Appl. No.: 551,111

[22] Filed: Oct. 31, 1995

Related U.S. Application Data

[62] Division of Ser. No. 197,592, Feb. 17, 1994, Pat. No. 5,488,629.

[30] Foreign Application Priority Data

| Feb. 17, 1993 | [JP] | Japan | 5-27711 |
| Feb. 24, 1993 | [JP] | Japan | 5-35099 |
| Aug. 3, 1993 | [JP] | Japan | 5-192167 |
| Oct. 4, 1993 | [JP] | Japan | 5-247911 |

[51] Int. Cl.$^6$ ...................................................... H04K 1/00
[52] U.S. Cl. ............................................. 375/206; 375/343
[58] Field of Search ........................... 375/200, 206, 375/208, 343, 209, 210; 364/728.03, 733, 717; 327/336, 349, 164

[56] References Cited

U.S. PATENT DOCUMENTS

| 4,291,409 | 9/1981 | Weinberg et al. | 375/347 |
| 4,841,544 | 6/1989 | Nuytkens | 375/206 |
| 4,933,952 | 6/1990 | Albrieux et al. | 375/200 |
| 4,943,976 | 7/1990 | Ishigaki | 375/200 |
| 4,995,053 | 2/1991 | Simpson et al. | 375/200 |

*Primary Examiner*—Tesfaldet Bocure
*Attorney, Agent, or Firm*—Lowe, Price, LeBlanc & Becker

[57] ABSTRACT

A digital correlator used in a receiving component of a spread spectrum communication system of a direct sequence modulation type is disclosed. A polarity of an input baseband signal is controlled by being inverted or not inverted according to a polarity of a spreading code signal by an amplifier, and the input baseband signal controlled is converted by an analog-to-digital converter into a digital signal. The digital signal is integrated for a prescribed period in an integrator, and a square of an integrated digital signal is calculated in a squaring device to obtain a squared value indicating a degree of a correlation between the input baseband signal and the spreading code signal. In cases where the input baseband signal and the spreading code signal correlate with each other, the squared value gradually increases with the passage of time. In contrast, in cases where the input baseband signal and the spreading code signal do not correlate with each other, the squared value is maintained to a low value. Therefore, the digital correlator can be manufactured by a simplified configuration.

10 Claims, 21 Drawing Sheets

CD : CORRELATING DETECTOR
CCR : CODE CLOCK RECOVERY
SCG : SPREADING CODE GENERATING
SAJ : SYNCHRONIZATION ACQUISITION JUDGEMENT

SC : SPREADING CODE

SYNC : SYNCHRONIZATION

SP : SIGNAL PROCESSING

FIG. 23

| | | | |
|---|---|---|---|
| C₁ | 11111110 10101001 10011101 11010010 11000110 11110110 10110110 01001000 | | |
| | 11100001 01111100 10101110 01101110 00101110 01100000 1000000 | | |
| C₂ | 11111110 00111011 00010100 10111110 10101000 01011011 11001110 01010110 | | |
| | 01100000 11011010 11101010 11001000 10000001 00100110 10011110 1110000 | | |
| C₃ | 11111110 11101101 11101000 10110010 11111000 10000001 10011011 00011100 | | |
| | 11101011 10000100 11000001 01010110 10010010 01000110 01111110 1010000 | | |
| C₄ | 11111110 01000000 10110000 01110100 00100111 00011010 01001011 10110111 | | |
| | 00110110 01010110 10111110 11110000 11000100 01010011 00111101 0101000 | | |
| C₅ | 11111110 01111101 10111101 10111000 00010100 00110110 01000001 11100010 11010110 | | |
| | 00010001 00111011 11010001 10011010 01100011 10010101 01110101 0010010 | | |
| C₆ | 11111110 10011000 01101000 01010010 11011001 10101010 00100000 10011111 | | |
| | 00111001 00100011 10000011 10000111 11010100 01011100 01111011 1011010 | | |
| C₇ | 11111110 01101101 01010001 00100010 00100110 01111100 11101110 00101100 | | |
| | 10100111 00100011 00010111 00001000 01101000 00111110 11000000 1010110 | | |
| C₈ | 11111110 11001011 00011011 10110100 00001000 10010011 10101001 00000110 | | |
| | 10111010 01010101 10111000 00001000 11010100 11101001 10011100 1001110 | | |
| C₉ | 11111110 11111000 11101110 10101010 10010101 11101001 10011100 11010110 00100010 | | |
| | 11101100 10000111 10010110 11100011 01000011 10100011 01101000 00011000 0100100 | | |

|     | $C_1$ | $C_2$ | $C_3$ | $C_4$ | $C_5$ | $C_6$ | $C_7$ | $C_8$ | $C_9$ |
|-----|-----|-----|-----|-----|-----|-----|-----|-----|-----|
| $C_1$ | 127 | 17  | 17  | 41  | 41  | 41  | 17  | 17  | 17  |
| $C_2$ | 17  | 127 | 17  | 17  | 17  | 41  | 11  | 11  | 17  |
| $C_3$ | 17  | 17  | 127 | 17  | 17  | 41  | 11  | 11  | 17  |
| $C_4$ | 41  | 17  | 17  | 127 | 17  | 17  | 41  | 11  | 17  |
| $C_5$ | 41  | 17  | 17  | 17  | 127 | 17  | 41  | 41  | 41  |
| $C_6$ | 41  | 41  | 41  | 17  | 17  | 127 | 17  | 17  | 41  |
| $C_7$ | 17  | 11  | 41  | 11  | 41  | 17  | 127 | 17  | 11  |
| $C_8$ | 17  | 41  | 41  | 11  | 41  | 17  | 17  | 127 | 17  |
| $C_9$ | 17  | 17  | 17  | 17  | 41  | 11  | 41  | 17  | 127 |

SIGNAL PROCESSING CIRCUIT FOR SPREAD SPECTRUM COMMUNICATIONS

This application is a division of application Ser. No. 08/197,592 issued as U.S. Pat. No. 5,488,629, on Jan. 30, 1996 filed Feb. 17, 1994.

BACKGROUND OF THE INVENTION

1. Field of the Invention

This invention relates to signal processing circuits for performing a synchronization acquisition and a frequency (offset) correction in case of using a spread quadrature modulation wave in a spread spectrum communication system. Further, this invention relates to a digital correlator for use in a receiving component of a spread spectrum communication system of the direct sequence modulation type. Moreover, this invention relates to an M phase shift keying (hereunder abbreviated as M-PSK (incidentally, M>4)) modulation/demodulation method employed in a spread spectrum communication system of the direct sequence modulation type. Furthermore, this invention relates to a spreading-code generating method for use in a code division multiple access (hereunder abbreviated as CDMA) system employing a spread spectrum communication method of the direct sequence modulation type.

2. Description of the Related Art

In recent years, it has been studied how a communication network using radio techniques (for example, a cellular network or a local area network (LAN)) is put to practical use. As an example of a communication method employed in such a communication network, a CDMA method using a spectrum spreading has been studied.

Further, principal two types of the spectrum spreading are a direct sequence (hereunder abbreviated as DS) type and a frequency hopping (hereunder abbreviated as FH) type. The DS type of spectrum spreading (hereunder sometimes referred to as DS/CDMA) is a method of effecting communications by directly performing a spectral spreading on an information signal by use of a spreading code or pattern having a frequency which is far higher than the frequency of the information signal (for instance, a frequency which is tens to thousands times the frequency of the information signal). The FH type of spectrum spreading (hereunder sometimes referred to as FH/CDMA) is a method of spreading the spectrum of a narrowband frequency-modulated signal by changing the frequency of a carrier according to a spreading-code pattern and averaging the signal resultingly. Incidentally, a CDMA method is a communication method for performing a multiplexing within a same frequency band by using different spreading-code patterns when effecting a spreading of the DS or FH type.

Previously, a binary phase shifting keys (hereunder abbreviated as BPSK) has been mainly used in case of the DS type of spectrum spreading. Recently, for the purpose of performing data communication at a high speed, a quadrature phase shift keying (hereunder abbreviated as QPSK) by which spectrum spreading and synthesization are performed on each of an in-phase channel (hereunder abbreviated as Ich) and a quadrature (namely, 180°-out-of-phase) channel (hereunder abbreviated as Qch), as well as an M-PSK (incidentally, M>4), has become studied enthusiastically.

In case of employing the spectrum spreading, the influence of what is called a transmission/reception frequency offset of a carrier wave at the time of initial synchronization acquisition is a serious matter. The reason is as follows. Namely, in cases of other communication systems (for instance, an FM broadcasting system and an analog automobile telephone system), a transmission/reception frequency offset can be suppressed by effecting a tracking by use of an automatic frequency control (hereunder abbreviated as AFC) in such a manner to maximize the signal level of a reception signal (namely, a received signal). In contrast, in case of employing the spectrum spreading, the signal level of a desired reception signal is sometimes lower than a noise level until the initial acquisition is completed and thus an AFC as used in the other communication systems cannot be realized in case of a communication system employing the spectrum spreading. Therefore, a method of sweeping the frequency of a carrier within a maximum frequency offset range basically is used in an AFC of the system employing the spectrum spreading. Such a method, however, has a drawback in that it takes time to perform a synchronization acquisition.

Thus a method of calculating the envelopes of components of a reception signal regardless of a frequency offset is employed in the conventional system using BPSK.

FIG. 1 is a schematic block diagram for illustrating the configuration of a conventional synchronization acquisition circuit of BPSK type. In this figure, reference numeral 310 designates a radio antenna; 320 a band-pass filter (hereunder abbreviated as BPF); 330 an AGC circuit; 341 and 342 down-mixers corresponding to Ich and Qch, respectively; 351 a local signal source; 352 a ($\pi/2$)-phase shifter; 361 and 362 low-pass filters (hereunder abbreviated as LPFs); 371 and 372 analog-to-digital (hereunder referred to simply as A/D) converters; 381 and 382 correlating detectors (hereunder sometimes referred to as correlators) for what is called a de-spreading; 391 and 392 squaring devices; 400 an adder; 410 a synchronization acquisition judgement circuit; 420 a data decoding circuit; 430 a spreading-code generating circuit; and 500 a code clock recovery circuit.

In the synchronization acquisition circuit of FIG. 1, a quadrature detection of a reception signal is first performed to obtain the channels (or components) Ich and Qch. Then, a correlating detection is performed on each of the components by using the same spreading code (namely, the sequence of the same spreading code words). Subsequently, the square of an output of each of the correlating detectors is obtained. In addition, the obtained squares of the outputs of the correlating detectors are added up to obtain the magnitude of the envelope (to be described later) represented on a phase plane. Thereby, the influence of the frequency offset at the time of synchronization acquisition is eliminated.

The above described operation of this synchronization acquisition circuit will be further explained hereinbelow by using expressions or equations (1) to (12). Here, let Dn, C, $\omega_o$, $\Delta\omega$ and N denote the amplitude of an information signal, a spreading code, a carrier angular frequency, a transmission/reception frequency offset and a reception in-band noise power. Further, the spreading code is C={$c_0$, $c_1$ ... $c_{M-1}$} (incidentally, M is a period). Here, a reception spectrum spreading signal y(i) is assumed to be given by the following equation:

$$y(i) = D_n c_i \cos(\omega_o + \Delta\omega)t + D_n c_i \sin(\omega_o + \Delta\omega)t + N \quad (1)$$

where N is assumed to be given by the following equation:

$$N = N_i \cos\omega_o t + N_q \sin\omega_o t \quad (2)$$

First, a quadrature detection is performed on the signal represented by the equation (1) (namely, the equation (1) is divided by $\exp(j\omega_o t)$) to obtain the in-phase channel Ich and the quadrature channel Qch. Then, these channels (or components) are applied to the LPFs, respectively. Thus output signals r(Ich) and r(Qch) of the LPFs corresponding to the input components Ich and Qch are obtained as follows:

$$r(Ich) = D_n c_i \cos \Delta\omega t + N_i \qquad (3)$$

$$r(Qch) = D_n c_i \sin \Delta\omega t + N_q \qquad (4)$$

Subsequently, a correlating detection is performed on each of the signals represented by the equations (3) and (4) by using a spreading code C' which is similar to the spreading code C but may be different from the sequence C only in phase. As is apparent from the definition of the spreading code, an output of each of the correlating detectors can be equal to or greater than a predetermined value only in case where C'=C. If the phase due to the frequency offset can be regarded as constant for one period of the spreading code C', the signal levels corresponding to the channels Ich and Qch are obtained as represented by the following equations (5) and (6), respectively:

$$\Sigma\{r(Ich) \times c'_i\} \; MD_n \cos \Delta\omega t \qquad (5)$$

$$\Sigma\{r(Ich) \times c'_i\} \; MD_n \sin \Delta\omega t \qquad (6)$$

Then, the squares of the rite sides of the equations (5) and (6) are added up as follows:

$$\begin{aligned}(MD_n \cos \Delta\omega t)^2 &+ (MD_n \sin \Delta\omega t)^2 \\ &= (MD_n)^2 (\cos^2 \Delta\omega t + \sin^2 \Delta\omega t) \\ &= (MD_n)^2\end{aligned} \qquad (7)$$

As is seen from the equation (7), the frequency offset $\Delta\omega$ vanishes and the square of the magnitude $MD_n$ of the envelope is obtained. Thus the judgement on the synchronization acquisition can be effected.

However, in case where QPSK is employed in the conventional system, if the spreading codes $C_I$ and $C_Q$ corresponding to Ich and Qch, respectively, are different from each other and $\Delta\omega$ becomes equal to ($\pi/2$) due to the influence of the frequency offset, a correlation cannot be detected. Namely, the reception signal y(i) in case of this case is assumed to be represented by the following equation:

$$y(i) = D_{In} c_{Ii} \cos (\omega_o + \Delta\omega)t + D_{In} c_{Qi} \sin (\omega_o + \Delta\omega)t + N \qquad (8)$$

Then, a quadrature detection is performed on this reception signal (namely, the equation (8) is divided by $\exp(j\omega_o t)$) to obtain the in-phase channel Ich and the quadrature channel Qch. Subsequently, these channels (or components) are inputted to the LPFs, respectively. Thus output signals r(Ich) and r(Qch) of the LPFs corresponding to the input channels or components Ich and Qch are obtained as follows:

$$r(Ich) = D_{In} c_{Ii} \cos \Delta\omega t - D_{Qn} c_{Qi} \sin \Delta\omega t + N_i \qquad (9)$$

$$r(Qch) = D_{Qn} c_{Qi} \cos \Delta\omega t + D_{In} c_{Ii} \sin \Delta\omega t + N_q \qquad (10)$$

Here, the equations (9) and (10) can be rewritten as follows by substituting ($\pi/2$) for $\Delta\omega$.

$$r(Ich) = -D_{Qn} c_{Qi} \sin \Delta\omega t + N_i \qquad (11)$$

$$r(Qch) = D_{In} c_{Ii} + N_q \qquad (12)$$

Thus, before the correlation detection, the component including $c_{Ii}$ is removed from the signal r(Ich) corresponding to Ich. Further, the component including $c_{Qi}$ is removed from the signal r(Qch) corresponding to Qch.

Therefore, in this case, the influence of a frequency offset can not be eliminated if the process effected in case of employing BPSK is performed. Consequently, it is difficult to achieve a synchronization acquisition. The present invention is created to resolve such a drawback of the conventional system.

It is, therefore, an object of the present invention to provide a signal processing circuit which can make a synchronization acquisition judgment without being influenced by a frequency offset.

Meanwhile, as the result of the recent progress in LSI techniques or the like, a spread spectrum communication system has come to be applied not only to military or satellite communications but also to industrial or private equipment. Especially, the application of the spread spectrum communication system to a cellular type mobile communications is now studied in the United States and so forth. Thus the spread spectrum communication techniques have rapidly come to draw the attention of the world. Among the various types of the spread spectrum communication methods, the direct sequence modulation method for spreading data by use of spreading-codes referred to as spread signals is advantageous in that a system for performing such a method can be constructed easily by using LSIs and that a distance can be measured by checking a time required to detect a correlation. Thus many research institutes proceed with the development of the direct sequence modulation method.

Hereinafter, a conventional spread spectrum communication system of the direct sequence modulation type will described briefly.

FIG. 2(a) is a schematic block diagram for illustrating the configuration of a spreading circuit of the conventional spread spectrum communication system. Further, FIG. 2(b) is a schematic block diagram for illustrating the configuration of a de-spreading circuit of the conventional spread spectrum system. In these figures, reference numerals 901, 902 and 909 are 2-input multipliers; 903 and 914 spreading-code generators for generating spreading-codes; 904 and 910 local oscillators for outputting local oscillation signals to be converted by the multipliers 902 and 909 into signals having radio frequencies or intermediate frequencies; 905 a power amplifier for amplifying signals of radio frequencies and transmitting the amplified signals; 906 and 907 a transmitting antenna and a receiving antenna; 908 a receiving front-end circuit for selecting components having frequencies of a required band from received signals of radio frequencies and increasing the levels of the selected components to a necessary signal level; 911 an A/D converter for converting a signal having a frequency of a baseband, which is obtained by the multiplier 909, to a digital signal; 912 a correlator; 913 a synchronizing circuit for monitoring a synchronization acquisition state according to a correlation output signal of the correlator; and 915 a clock generator for generating timing clock signals for the A/D converter 911, the spreading-code generator 914 and so on according to information obtained by the synchronizing circuit 913.

The circuit of FIG. 2(a) is a spreading portion of a transmitting unit. Further, a data signal to be transmitted is inputted to the multiplier 901 from left, as viewed in this figure. Data represented by the data signal is multiplied by a code represented by a spreading-code signal, which is generated in the spreading-code generator 903, by the multiplier 901. Namely, the multiplier 901 outputs a signal, the spectrum of which is spread over the frequencies of the spreading-code signal. Here, pseudo-noise code (PN code) signals are used as the spreading code signals (incidentally, typical examples of a PN code (set) are what is called the M-code and what is called the Gold code). (Incidentally, the autocorrelation characteristics of each of spreading-code patterns and the characteristics of the cross correlation between a spreading-code pattern of a code sequence and another spreading-code pattern of the same code sequence vary with the code.) The spectrum of a data signal to be transmitted is spread by using this spreading-code signal. Further, the spreading of a data signal is sometimes effected at a frequency $2^n$-times the frequency of the data signal, for the easiness of de-spreading and for the simplicity of the configuration of the circuit.

Next, the signal spread by the multiplier 901 is mixed by the multiplier 902 with a signal sent from the local oscillator 904. Then, a resultant signal is amplified by the power amplifier 905. Thereafter, the amplified signal is transmitted from the antenna 906.

In contrast, in a receiving unit of FIG. 2(b), a de-spreading is effected by performing a reverse procedure of the spreading (namely, performing a demodulation) and the original signal (namely, the data signal) is recovered. First, a signal obtained by increasing the signal levels of a part of a signal received from the antenna 907, which part corresponds to a required band, to a necessary signal level is multiplied by a local oscillation signal of the same frequency as the oscillation frequency of the local oscillator of the transmitting unit, which is issued from the local oscillator 910, in the multiplier 909. Thus a baseband signal, which is spread by using the spreading-code, is obtained. Subsequently, such a signal is converted by the A/D converter 911 into a digital signal. Then, the correlator 912 obtains a correlation value from this digital signal and another signal sent from the spreading-code signal generator 914 which generates the same spreading-code signal as generated in the transmitting unit.

Next, the synchronizing circuit 913 monitors the synchronization acquisition state according to an output of the correlator 912 and controls the spreading-code signal generator 914 and the clock generator 915 to provide a feedback to the correlator 912. Namely, a feedback loop is established in this process. Thus, the circuit 913 operates to stably obtain an output of the correlator and ensure the synchronization.

FIG. 3 is a detail block diagram for illustrating the configuration of the conventional correlator which employs a digital matched filter practically. In this figure, reference numeral 101 designates a shift register for shifting data represented by a signal, which is obtained as a result of the A/D conversion, in response to each sampling clock. This shift register has capacity sufficient to store data sent thereto for what is called a spreading period. Further, reference numeral 102 denotes an arithmetic circuit for producing a product of a spreading-code and data represented by a signal inputted to the shift register 101; and 103 an adder for obtaining a total sum of results of arithmetic operations effected in the arithmetic circuit 102.

In this conventional correlator with the configuration described hereinabove, a signal obtained by performing A/D conversion on the reception signal converted into a baseband signal is inputted to the shift register 101. As shown in this figure, a product of each of signals $\gamma_0$ to $\gamma_{(n-1)}$ inputted to the shift register 101 and a corresponding one of spreading-code signals $ref_0$ to $ref_{(n-1)}$ is calculated by the arithmetic circuit 102. Further, a correlation output or value is obtained from a result of the addition effected by the adder 103. In case where 1 bit of the transmitted data is synchronized with the spread signal correspondingly to one period of the spreading-code signal, the data can be decoded by making comparisons among the correlation values, for example, by using the maximum and minimum values of the correlation outputs. Further, the frequency of a clock signal can be regulated such that the square of the correlation value maintains its maximum value. Moreover, the same number as of the corresponding spreading-codes or an integral multiple thereof for a clock correction is often selected as the number of stages of shift registers.

The conventional correlator, however, has drawbacks in that a large number of gates such as a shift register, a multiplier and adder is needed and thus the size of the circuit becomes large and that the power consumption thereof also becomes large. Especially, in case of the conventional correlator of the type that performs a sampling of 1 bit of the spreading-code signal a plurality of times, the operating frequency of the adder 103 becomes high. This drawback affects the realizability of the conventional correlator of such a type. The present invention is accomplished to eliminate the drawbacks of the conventional correlator.

It is, accordingly, an object of the present invention to provide a digital correlator which can reduce the size and power consumption thereof and increase the operating frequency thereof.

FIG. 4(a) is a schematic block diagram for illustrating the transmitting unit of a conventional spread spectrum communication system of the direct sequence type that employs a QPSK. Further, FIG. 4(b) is a schematic block diagram for illustrating the receiving unit of this spread spectrum communication system.

In the transmitting unit of FIG. 4(a), an input signal is first inputted to a QPSK encoder 1101 which performs a mapping of the input signal onto symbol signals representing symbols used in QPSK modulation. Thus data represented by the input signal are converted into two data sequences corresponding to symbols I and Q, respectively. These data sequences I and Q are multiplied by data represented by signals sent from corresponding spreading-code generators $1104_i$ and $1104_q$ in modulo-2 multipliers $1103_i$ and $1103_q$, respectively. Then, results of the multiplications are sent therefrom to a quadrature modulation portion 1109 in which PN-code signal is often used as a spreading-code signal. The spectrum of a signal representing data to be transmitted is spread by using the spreading-code signal. In this figure, the quadrature portion 1109 is indicated by being surrounded by dashed lines. Further, in mixers $1105_i$ and $1105_q$ of the portion 1109, the respective output signals of the generators $1104_i$ and $1104_q$ are mixed with a signal sent from a first local oscillator 1107 and another signal obtained by shifting the phase thereof by ($\pi/2$). Then, outputs of the mixers $1105_i$ and $1105_q$ are added up by an adder 1108. Thereafter, an output signal of the adder 1108 is mixed by a mixer 1110 with a signal sent from a second local oscillator 1111 and thus is converted into a signal of a carrier band. Finally, an output signal of the mixer 1110 is transmitted from an antenna 1112.

In the receiving unit of FIG. 4(b), a signal received from an antenna 1113 is first mixed by a mixer 1114 with another signal sent from a first local oscillator 1115 and is thus converted into a signal of an intermediate frequency band. Then, the converted signal is further converted by mixers $1116_i$ and $1116_q$ into baseband signals corresponding to I and Q, respectively, by using a signal sent from a second local oscillator 1119 and another signal obtained by a phase shifter 1117 by shifting the phase thereof by (π/2). Such a frequency conversion of a signal to baseband signals by using quadrature signals is called as a quadrature detection. Further, a quadrature detection portion 1118 consists of the mixers $116_i$ and $1116_q$ and the phase sifter 1117. Thereafter, correlation values are obtained from data signals (namely, the baseband signals) and spreading-code signals generated by spreading-code generators $1121_i$ and $1121_q$, which are the same as those generated by the spreading-code generators of the transmitting unit. It is, however, rare that the sum of the oscillation frequencies of the first and second local oscillators 1115 and 1119 of the receiving unit is exactly equal to the carrier frequency of the transmitting unit (namely, the sum of the oscillation frequencies of the first and second local oscillators of the transmitting unit). Thus what is called a phenomenon of "(phase) rotation" of data on a phase plane (namely, a phase shift of data) is liable to take place. Therefore, in order to decode data, a correlation is obtained by using 2 correlators 1120a to 1120d. Further, an angle of "phase rotation" (namely, an amount of angular displacement or phase shift) is obtained by a phase detecting circuit 1701. Finally, data is decoded, performing a frequency offset compensation in a QPSK data decoder 1702.

This conventional system, however, has drawbacks in that the configurations of the phase detecting circuit and the QPSK data decoder become complex and that if the transmission rate becomes high, the circuit thereof is limited in processing speed. The present invention is created to eliminate these drawbacks of the conventional system.

It is, therefore, an object of the present invention to provide an M-PSK modulation/demodulation method, by which the configuration of a decoding portion can be simplified without spreading a necessary band in case where a transmission rate is the same as of the conventional system.

It is another object of the present invention to provide an M-PSK modulation/demodulation method, by which good characteristics can be obtained without a frequency-offset compensation circuit.

It is a further object of the present invention to provide an M-PSK modulation/demodulation method, by which characteristics of a spread spectrum communication system can be improved when effecting a multiplexing.

It is still another object of the present invention to provide an M-PSK modulation method, by which the processing speed of a signal processing circuit of a spread spectrum communication system can be increased in comparison with the conventional system employing a QPSK modulation.

Meanwhile, in a conventional system employing a CDMA method, a multiplexing is performed on signals of a same frequency band in order to increase channel capacity. This conventional system, however, has encountered a problem in that such a multiplexing is difficult when using only the M-code or the Gold code.

Further, it is preferable for suppressing the interference between spread waves or signals to use spreading-code patterns having small cross correlation. However, the kinds of the combination of such spreading-code patterns are limited. Moreover, in case of a system of the DS type employing a QPSK (hereunder sometimes referred to as DS/QPSK type), different spreading-code patterns are used corresponding to Ich and Qch, respectively. However, in case where two channels (or components) Ich and Qch are not completely separated in a receiving unit due to an frequency offset after a quadrature detection, if the cross correlation between the spreading-codes respectively corresponding to the channels (or components) Ich and Qch is large, the interference between the components occurs at the time of performing a correlation detection on each of the components Ich and Qch.

As to the problem relating to the channel capacity, what is called the degree of multiplexing (hereunder sometimes referred to as the multiplexing degree) can be increased by lengthening the period of the spreading-code to increase what is called a spreading rate. However, in a practical system, the spreading rate is limited due to the conditions such as the relation between the spreading band width and the information transmission rate and the operating speed of the system. Thus, practically, it is difficult to employ the spreading code of a sufficiently long period.

In case of employing a CDMA method, the relation between the degree of multiplexing and the quality of communication depends on the characteristics of the cross correlation between the code patterns to a large extent. As above stated, the M-code, the Gold code sequence or the like have been studied as the spreading code for a spectrum spreading. For example, it is known that the M-code has good autocorrelation characteristics and thus the peak of the correlation value can be easily detected, though the number of code patterns which can be generated therefrom is small. In contrast, in case of the Gold code, the number of character patterns which can be generated therefrom is larger than that in case of the M-code. However, the Gold code has undesirable characteristics of the cross correlation between code patterns thereof. Thus, when performing a multiplexing, the quality of communication is extremely deteriorated due to the interference between the spread waves or signals. Hence, there is limitation on the number of channels which can be used for communication simultaneously.

Recently, there has been studied a method using an orthogonal code which has good characteristics of the cross correlation between code patterns obtained therefrom. Generally, in case where the orthogonality between code patterns of the orthogonal code is maintained, there is no cross correlation therebetween and thus the degree of multiplexing can be large. In contrast, when the orthogonality is lost, the cross correlation between the code patterns thereof is deteriorated considerably. Therefore, what is called an intersymbol synchronization is necessary in case of employing the orthogonal code in a CDMA system as the spreading code.

Further, in case of employing a Hadamard sequence which is a kind of orthogonal code, a Hadamard matrix having the code length of $2^{(n+1)}$ is generated by performing a Hadamard transform on a 2×2 Hadamard matrix n times. As can be seen from this generation process, a code pattern consists of repetitive code sub-patterns. Thus, a Hadamard code has undesirable characteristics of the autocorrelation. Consequently, a conventional system employing a Hadamard code has a drawback in that it is difficult to achieve a synchronization acquisition and a multipath separation. The present invention is accomplished to eliminate this drawback of the conventional system.

It is, accordingly, an object of the present invention to provide an M-PSK modulation method by which the interference between the phase components of a data signal can be suppressed.

It is another object of the present invention to provide an M-PSK modulation method by which the degree of multiplexing can be increased.

SUMMARY OF THE INVENTION

To achieve the foregoing object and in accordance with an aspect of the present invention, there is provided a signal processing circuit which comprises a frequency conversion circuit for converting a spread quadrature modulation signal of a received carrier band, which is obtained by performing a direct sequence type of a spectrum spreading on an in-phase component and a quadrature component of an information signal by using different spreading codes in a transmitting unit, into a baseband signal which has an in-phase component and a quadrature component separated from each other, a first correlating detector for a de-spreading, which detects a correlation between the in-phase component of the baseband signal and the spreading code corresponding to the in-phase component of the information signal, a second correlating detector for a de-spreading, which detects a correlation between the quadrature component of the baseband signal and the spreading code corresponding to the in-phase component of the information signal, a third correlating detector for a de-spreading, which detects a correlation between the in-phase component of the baseband signal and the spreading code corresponding to the quadrature component of the information signal, a fourth correlating detector for a de-spreading, which detects a correlation between the quadrature component of the baseband signal and the spreading code corresponding to the quadrature component of the information signal, a decoding circuit for decoding data from outputs of the first, second, third and fourth correlating detectors, a first multiplier for calculating a square of the output of the first correlating detector, a second multiplier for calculating a square of the output of the second correlating detector, a first adder for adding up outputs of the first and second multipliers, a judgment circuit for performing a synchronization acquisition judgement according to an output level of the first adder, a second adder for adding the outputs of the first and second correlating detectors up, or adding the outputs of the third and fourth correlating detectors up, or adding the outputs of the first and fourth correlating detectors up, a subtracter for performing a subtraction between the outputs of the second and third correlating detectors and a correction circuit for obtaining a frequency offset according to an output of the second adder and/or an output of the subtracter and performing a correction when the data is decoded.

Thus, in the receiving unit of the signal processing circuit of the present invention with the above described configuration, a quadrature detection is first performed on a QPSK modulation wave or signal to split the QPSK modulation signal into an in-phase component and a quadrature component. Then, correlation detection is performed on one of or both of the in-phase and quadrature components by using the spreading code $C_I$ corresponding to the in-phase component (or channel) Ich of the transmitting unit and the spreading code $C_Q$ corresponding to the quadrature component (or channel) Qch. Subsequently, synchronization acquisition judgment is effected by using the sum of the squares of correlation outputs obtained as results of the detection performed on the same component by using the spreading codes $C_I$ and $C_Q$. Thereby, the influence of a frequency offset is eliminated.

Further, after the synchronization acquisition, the frequency offset is found from the correlation outputs obtained by using the spreading codes $C_I$ and $C_Q$. Then, an AFC operation is performed.

Hereinafter, the operation of the circuit of the present invention will be described by using equations practically. In case where the correlation detection is performed on the signals Ich and Qch expressed by the equations (9) and (10), respectively, by using the spreading codes $C_I'$ and $C_Q'$, the cross correlation $C_I \times C_Q$ obtained at the time of detecting the autocorrelations of the spreading codes $C_I$ and $C_Q$ is sufficiently small and can be neglected. Further, noises are averaged in one period of the spreading code. Thus, when the phase due to the frequency offset can be regarded as substantially constant during one period of the spreading code, outputs of the correlators are obtained as follows.

$$\Sigma\{r(Ich) \times c_{Ii}'\} \; MDI_n \cos \Delta \omega t \tag{13}$$

$$\Sigma\{r(Ich) \times c_{Qi}'\} \; -MDQ_n \sin \Delta \omega t \tag{14}$$

$$\Sigma\{r(Qch) \times c_{Ii}'\} \; MDI_n \sin \Delta \omega t \tag{15}$$

$$\Sigma\{r(Qch) \times c_{Qi}'\} \; MDQ_n \cos \Delta \omega t \tag{16}$$

Then, the squares of the right sides of the equations (13) and (15) are added together as follows.

$$\begin{aligned}(MDI_n \cos \Delta \omega t)^2 &+ (MDI_n \sin \Delta \omega t)^2 \\ &= (MDI_n)^2 (\cos^2 \Delta \omega t + \sin^2 \Delta \omega t) \\ &= (MDI_n)^2\end{aligned} \tag{17}$$

Thus, similarly as in case of employing a BPSK modulation, a synchronous detection can be effected without being affected by the frequency offset if the phase due to the frequency offset can be regarded as substantially constant for one period of the spreading code.

Moreover, in case of the circuit of the present invention, the magnitude of the frequency offset can be found by using the outputs of the correlators, which are expressed by the equations (13) to (16). Namely, tan $\Delta \omega t$ can be obtained by using, for instance, the equations (13) and (15) as follows:

$$MDI_n \sin \Delta \omega t / MDI_n \cos \Delta \omega t = \tan \Delta \omega t \tag{18}$$

Thus, if $-(\pi/2) \leq \Delta \omega t \leq (\pi/2)$, the value of $\Delta \omega t$ can be obtained from the following equation:

$$\Delta \omega t = \arctan \{MDI_n \sin \Delta \omega t / MDI_n \cos \Delta \omega t\} \tag{19}$$

Incidentally, $\Delta \omega t$ can be similarly obtained if the equations (14) and (16) are used instead of the equations (13) and (15).

Furthermore, as will be described hereunder, $\Delta \omega t$ can be similarly obtained if the equations (13) to (16) are used.

First, the following equation is obtained from the equations (13) and (16).

$$MDI_n \cos \Delta \omega t + MDQ_n \cos \Delta \omega t = M(DI_n + DQ_n) \cos \Delta \omega t \tag{20}$$

Then, the following equation is obtained by subtracting the right side of the equations (14) from that of the equation (15).

$$MDI_n \sin \Delta \omega t + MDQ_n \sin \Delta \omega t = M(DI_n + DQ_n) \sin \Delta \omega t \tag{21}$$

Thus, tan $\Delta \omega t$ can be obtained by using the equations (20) and (21) as follows:

$$M(DI_n + DQ_n) \sin \Delta \omega t / M(DI_n + DQ_n) \cos \Delta \omega t = \tan \Delta \omega t \tag{22}$$

Therefore, as is apparent from the equation (22), the value of $\Delta \omega t$ can be obtained similarly.

Additionally, an asynchronous quadrature detection is effected in the receiving unit. Thus, a delay (or differential) detection can be performed as follows. Namely, the AFC circuit can obtain information concerning $\Delta \omega$ and then send the obtained information to the data decoding circuit. Moreover, the outputs of the correlators expressed by the equations (13) and (16) may be divided by (cos Δωt) and the frequency offset can be corrected. Further, an absolute synchronous detection can be achieved by changing the frequency of a local signal, which is used at the time of the modulation of the carrier band signal by using the baseband signal, from exp(jωct) to exp(j(ωc−Δω)t) by use of Δω obtained by the AFC circuit.

As described above, the synchronization acquisition can be effected without being influenced by the frequency offset in case of the circuit of the present invention with the above-mentioned configuration. Therefore, when performing the method of sweeping the frequency of the carrier within the maximum frequency offset range, a time required for the synchronization acquisition can be reduced.

Further, in case of the circuit of the present invention, the magnitude of the frequency offset can be found by using the outputs of the correlators. Thus the circuit of the present invention can be used not only for a synchronous detection method, which needs a carrier regeneration, but also for a delay detection method in which the frequency offset is corrected within the baseband immediately after the asynchronous quadrature detection.

Further, in accordance with another aspect of the present invention, there is provided a digital correlator which controls by using a spreading code signal whether or not the polarity of an input signal or a baseband reception signal obtained as a result of an A/D conversion is inverted. Alternatively, this digital correlator performs a processing, which is equivalent to such a control operation, on the input signal or the reception signal. Then, in this correlator, an integrator integrates the input signal for a predetermined period of time. Thereafter, the square of an output of the integrator is calculated. Further, in case of employing a modulation method by which signals are mapped onto a phase plane (namely, a complex plane), the correlations corresponding to the axes, respectively, are obtained. Then, the obtained correlations are added together.

Thus, the correlator of the present invention with the above described configuration employs a integrating method of the type that every sampling (namely, every A/D conversion), an addition or a subtraction is performed on signals only one time. The correlator with a simple configuration can be realized. Thereby, increase in operating frequency, as well as reduction in power consumption and in size of the circuit, can be achieved. Further, the correlator of the present invention, which performs a sampling a plurality of times for a time corresponding to 1 bit of the spreading code, can obtain desired results.

Moreover, in accordance with a further aspect of the present invention, there is provided an M-PSK modulation method by which a differential BPSK (hereunder abbreviated as DBPSK) modulation or a BPSK modulation is performed on signals representing sequences of data to be coded correspondingly to symbol signals I and Q (namely, an in-phase component and a quadrature component), by using the frequencies of carriers, the phases of which are different from each other, in a transmitting unit and a resultant synthesized signal is transmitted therefrom, wherein a BPSK delay detection or a BPSK detection is performed in an receiving unit on signals obtained as results of quadrature detection by using output signals of corresponding correlators. Furthermore, in an embodiment, an angle of "phase rotation" (namely, phase shift) due to a frequency offset is estimated from outputs of correlators and is compensated and further, a decoding is effected by using values of correlations corresponding to the components (or channels) I and Q, for the purpose of coping with the rotation on a phase plane.

Thus, in accordance with the present invention, even in case of the M-PSK modulation, a decoding of a baseband signal can be achieved by performing a BPSK type decoding in a receiving unit of a spread spectrum communication system of the DS. As the result, the configuration of the circuit of the receiving unit can be simplified. Moreover, the processing speed can be decreased. Further, when reproducing original data, data obtained as the result of the BPSK type decoding is decoded again by using the employed code. Therefore, the larger M becomes, the greater effects of the simplification become. Furthermore, even in case of employing a BPSK delay detection, a data decoding with high reliability can be achieved under conditions (to be described later) similarly as in case of employing a synchronous detection of the M-PSK demodulation system. Additionally, the frequency offset can be compensated by finding an angle of "phase rotation" due to the frequency offset from outputs of corresponding correlators and correcting the frequency of an oscillator of the receiving unit, or by cancelling the "phase rotation" of data when decoding the data and making a judgment on the data. Here, an output of the correlator corresponding to a spreading code (i), which corresponds to the in-phase component, and to the component I of the receiving unit becomes 0 due to the "(phase) rotation" on the phase plane when the angle of "phase rotation" is equal to (π/2) or π. Thus, by compensating the frequency offset by adding up outputs of correlators respectively corresponding to the components I and Q, it becomes possible to omit a circuit for distinguishing a case where such an addition is not performed. Consequently, the construction of the circuit can be further simpler. Further, effects of the simplification of the configuration of the circuit can be increased. Furthermore, the characteristics of the system employing a multiplexing can be improved.

Furthermore, in accordance with yet another aspect of the present invention, there is provided a spreading code generating method in which codes each having a good autocorrelation are employed as different spreading code patterns used correspondingly to phase components, respectively, and the spreading code patterns are multiplied by a same orthogonal code having good cross correlation characteristics to generate a spreading code pattern. Thereby, the degree of multiplexing can be increased.

Thus, the spreading code pattern can be generated by utilizing the characteristics of the codes. (In an embodiment, a PN code is used as the codes having a good autocorrelation.) Further, the interference between spread signals can be decreased. Thus, for instance, a QPSK signal can be split to the components Ich and Qch by using a PN code. Namely, one orthogonal code can be assigned to a QPSK modulation signal.

At that time, if an intersymbol synchronization is taken, there is no cross correlation between signals respectively having phase components, to which a same PN code pattern is assigned, due to the orthogonal code. Thus, the interference can be reduced and the degree of multiplexing can be increased.

In contrast, even if no intersymbol synchronization is taken, the phase components are multiplied by the PN code. Thus the deterioration of the characteristics of the cross correlation is reduced in comparison with the case where only the orthogonal code is used, and the characteristics of the cross correlation are almost the same as those of the conventional case employing a PN code. Similarly, the problem of the prior art, namely, the difficulties in effecting the synchronization acquisition and the multipath separation can be overcome due to the high autocorrelation of the PN code.

However, there is restriction on the combination of code patterns of a given spreading code, which have a small cross correlation. Meanwhile, when causing a phase offset in code patterns having large cross correlations, in a circulating manner, the cross correlations vary and sometimes the code patterns have a minimum value of the cross correlation therebetween at a given phase offset. Thus, another spreading code generating method is devised according to the present invention, in view of the fact that an intersymbol synchronization is always established in cases of the phase components of given M-PSK modulation signals.

Namely, in accordance with an additional aspect of the present invention, there is provided a spreading code generating method in which among spreading code patterns comprised of spreading codes used for M-PSK modulation of the DS type, spreading code patterns each having a maximum value of the cross correlation larger than the values of the cross correlations of the other spreading code patterns are employed as the different spreading code patterns used correspondingly to the phase components, and circulating the employed spreading code patterns mutually and causing a phase offset therein at a point where the cross correlation between the codes of the employed spreading code patterns has a minimum value.

Thereby, the interference between the spread waves can be suppressed and simultaneously, the cross correlation between the patterns can be minimized when the phase components are not completely separated from each other in the receiving unit. This utilizes the fact that the phase components are always synchronized with each other and the value of the cross correlation between the phase components is constant, as described above. Additionally, if another spread wave or signal interferes with one of the phase components, there is no correlation between this spread wave and the other phase component. Consequently, the possibility of an occurrence of malfunction in a synchronization acquisition and maintenance or the like is reduced.

BRIEF DESCRIPTION OF THE DRAWINGS

Other features, objects and advantages of the present invention will become apparent from the following description of preferred embodiments with reference to the drawings in which like reference characters designate like or corresponding pares throughout several views, and in which:

FIG. 23 is a diagram for illustrating patterns of codes employed in a DS/QPSK system for performing a spreading code generating method according to the present invention (namely, a fourteenth embodiment of the present invention);

FIG. 24 is a diagram for illustrating practical examples of quadrature spreading code sets generated in the fourteenth embodiment of the present invention; and FIG. 25 is a diagram for illustrating maximum values of the cross correlations between the code patterns of FIG. 23.

DETAILED DESCRIPTION OF THE PREFERRED EMBODIMENTS

Hereinafter, the preferred embodiments of the present invention will be described in detail by referring to the accompanying drawings.

(Embodiment 1)

First, a first embodiment of the present invention will be described hereinbelow in detail by referring to FIG. 5.

Figure 5:
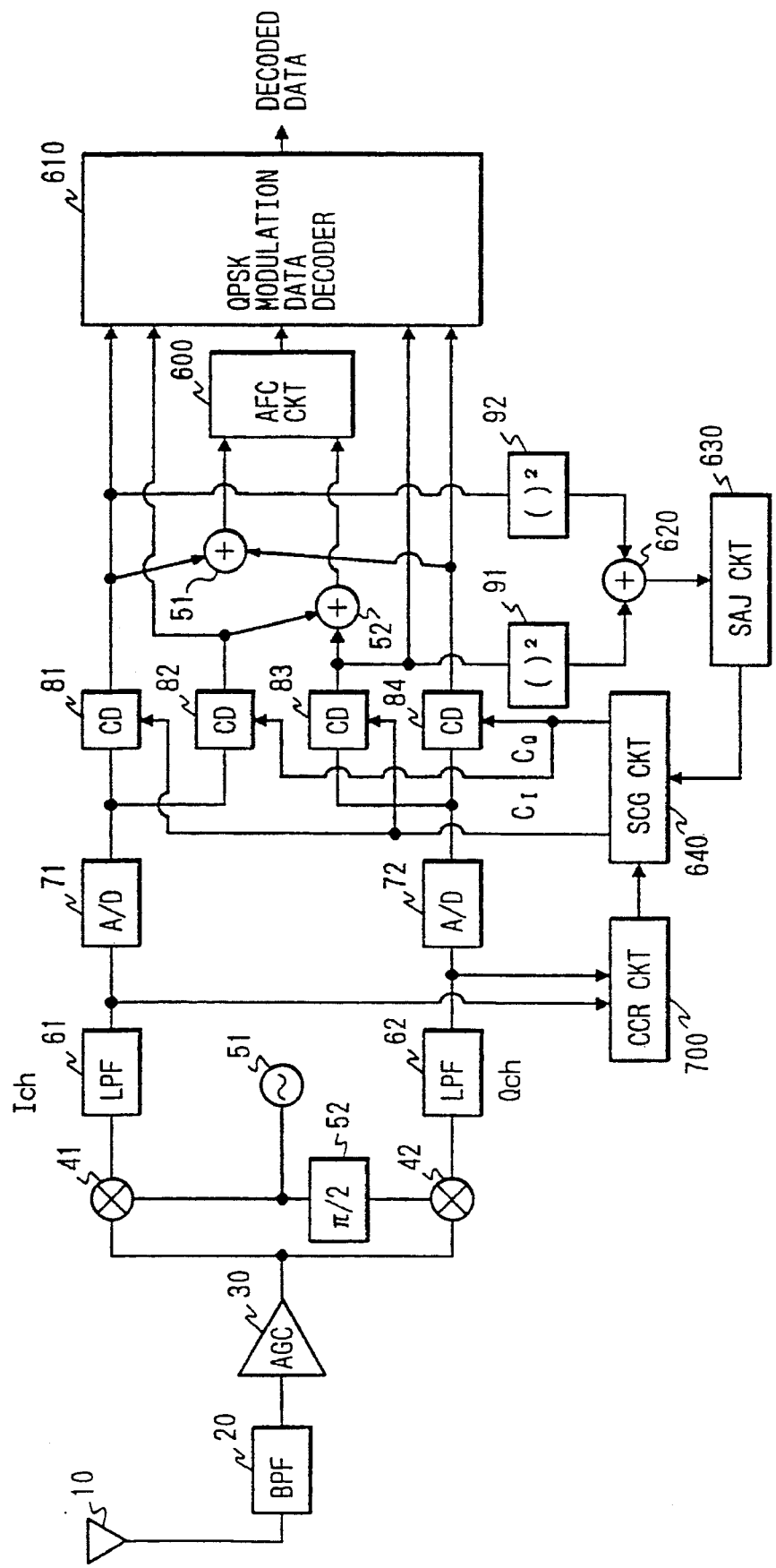
FIG. 5 is a schematic block diagram for illustrating the configuration of a primary part of a signal processing circuit embodying the present invention (namely, a first embodiment of the present invention)

FIG. 5 is a schematic block diagram for illustrating the configuration of a primary part (namely, synchronization acquisition and AFC circuits) of a signal processing circuit embodying the present invention (namely, the first embodiment of the present invention).

In this figure, reference numeral 10 designates a radio antenna; 20 a BPF for transmitting a definite band of frequencies of a signal received from the radio antenna 10; 30 an AGC circuit for performing an automatic gain control operation on an output of the BPF 20; 41 a down-mixer corresponding to the in-phase component (or channel) Ich of the signal; 42 a down-mixer corresponding to the quadrature component (or channel) Qch of the signal; 51 a local signal generator; 52 a ($\pi/2$)-phase shifter; 61 and 62 LPFs; 71 and 72 A/D converters; 81 to 84 correlating detectors each for a de-spreading 91 and 92 squaring devices each for calculating the square of an input signal; 600 an AFC circuit; 610 a data decoding circuit; 651 an adder for adding up outputs of the correlators 81 and 84; 652 an adder for adding up an output of the correlator 82 and a negative output of the correlator 84; 620 an adder for adding up outputs of the squaring device 91 and 92; 630 a synchronization acquisition judgment circuit; 640 a spreading code generating circuit; and 700 a code clock recovery circuit.

When the radio antenna 10 receives a spread quadrature modulation wave or signal having an in-phase component Ich and a quadrature component Qch which have undergone a spectrum spreading process using a spreading code $C_I$ and another spectrum spreading process using a spreading code $C_Q$, respectively (incidentally, in each of these processes, what is called the spreading code rate is N times per symbol), the spread quadrature modulation signal received by the antenna 10 is sent through the BPF 20 and the AGC circuit 30 to the mixers 41 and 42 for performing a frequency conversion and converting a signal inputted thereto into a baseband signal. Then, in the mixers 41 and 42, the spread quadrature modulation signal (namely, the reception signal) is down-converted into an in-phase component Ich and a quadrature component Qch which have frequencies of the baseband, by using carriers which have been generated by the local signal generator 51 and inputted to the mixers 41 and to the mixer 42 through the phase-shifter 42 for performing a quadrature separation.

The components Ich and Qch of the baseband signal converted from the reception signal is converted at the spreading code rate by the A/D converters 71 and 72 into digital signals after passing through the LPFs. Simultaneously with this, the signal Ich and Qch having passed through the LPFs are sent to the code clock recovery circuit whereupon a spreading code clock is recovered.

After the A/D conversion, correlation detections are performed on the signals Ich and Qch each data symbol interval in the correlators by using the spreading codes $C_I$ and $C_Q$ generated by the spreading code generator 640. Namely, the correlators (namely, the correlating detectors) 81, 82, 83 and 84 detect the correlation between the signal Ich represented by the equation (13) and the spreading code $C_I$, that between the signal Ich represented by the equation (14) and the spreading code $C_Q$, that between the signal Qch represented by the equation (15) and the spreading code $C_I$, that between the signal Qch represented by the equation (16) and the spreading code $C_Q$, respectively. Further, a synchronization acquisition detection is performed according to the equation (17) by using a value obtained by the adder 620. Namely, the adder 620 adds up outputs of the squaring devices 91 and 92 which calculate the square of a value of the correlation detected by the correlator 81 and that of a value of the correlation detected by the correlator 83, respectively. Then, the synchronization acquisition judgment circuit 630 judges from the output of the adder 620 whether or not the synchronization acquisition is achieved. Further, an initial synchronization acquisition is effected by controlling the patterns of codes generated by the spreading code generating circuit 640.

Next, when the synchronization acquisition of the spreading code is established, the AFC circuit 600 starts a frequency offset correction processing. In case of this embodiment, the frequency offset is obtained according to the equation (22). Thus, the frequency offset $\Delta\omega$ is obtained in the AFC circuit 600 by using an output of the adder 651

(namely, a result of adding up correlation outputs of the correlators 81 and 84) and an output of the adder 152 (namely, a result of adding the inverse of a correlation output of the correlator 82 to a correlation output of the correlator 84). Then, correction value information is sent to the data decoding circuit 610 therefrom. Subsequently, the data decoding circuit 610 decodes data according to the outputs of the correlators 81 to 84 and the AFC circuit 600.

As described above, this embodiment is provided with the correlators for a de-spreading, which correspond to the different combinations of the spreading codes $C_I$ and $C_Q$ and the components (or channels) Ich and Qch obtained as the result of the quadrature detection. Further, the synchronization acquisition judgment is effected by using a sum of the squares of outputs of the correlators. Thus, in case where the phase due to the frequency offset corresponding to one period of the spreading code can be regarded as almost constant, the influence of the frequency offset can be eliminated. Moreover, a time required for a synchronization acquisition when effecting an initial synchronization acquisition can be reduced. Furthermore, the frequency offset can be obtained by using outputs of the correlators. Consequently, when decoding data, the frequency offset correction can be realized.

Figure 1:
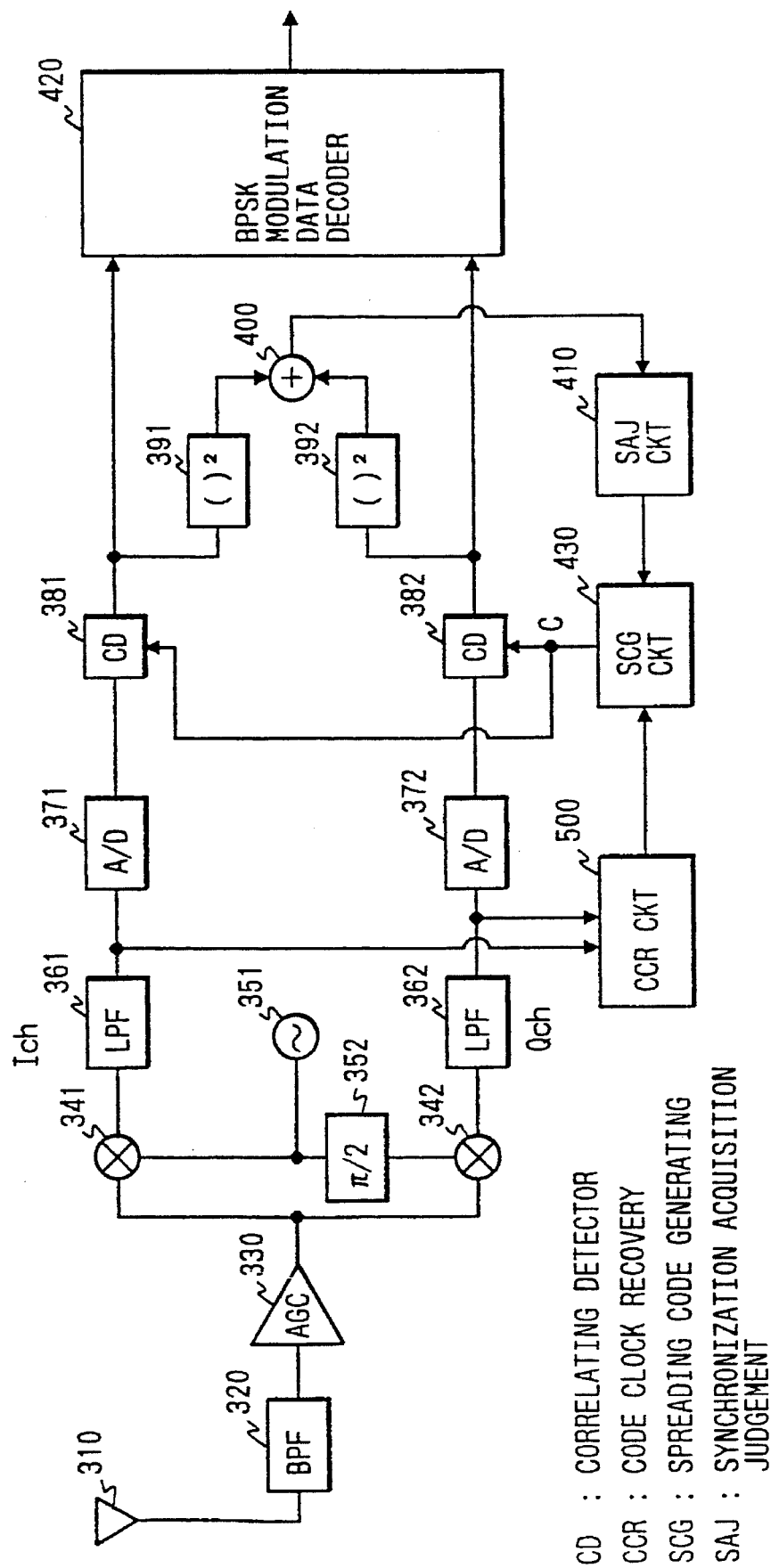
FIG. 1 is a schematic block diagram for illustrating the configuration of a conventional synchronization acquisition circuit of BPSK type.

Incidentally, the circuit of this embodiment is constructed to obtain the frequency offset according to the equation (22). However, the circuit of this embodiment may be modified to obtain the frequency offset according to the equation (19). In such a case, the adders 621 and 652 are removed from the configuration of FIG. 1. Moreover, the combination of outputs of the correlators 81 and 83 is used for the synchronization acquisition judgement. However, if the combination of outputs of the correlators 82 and 84 is used, a synchronization acquisition judgment can be similarly performed. Furthermore, in case of this embodiment, outputs of the four correlators are used for decoding data. However, the combination of outputs of the correlators 82 and 83 may be used for decoding data, instead of the outputs of the four correlators.

(Embodiment 2)

Next, a second embodiment of the present invention will be described hereinbelow in detail by referring to FIG. 6.

Figure 6:
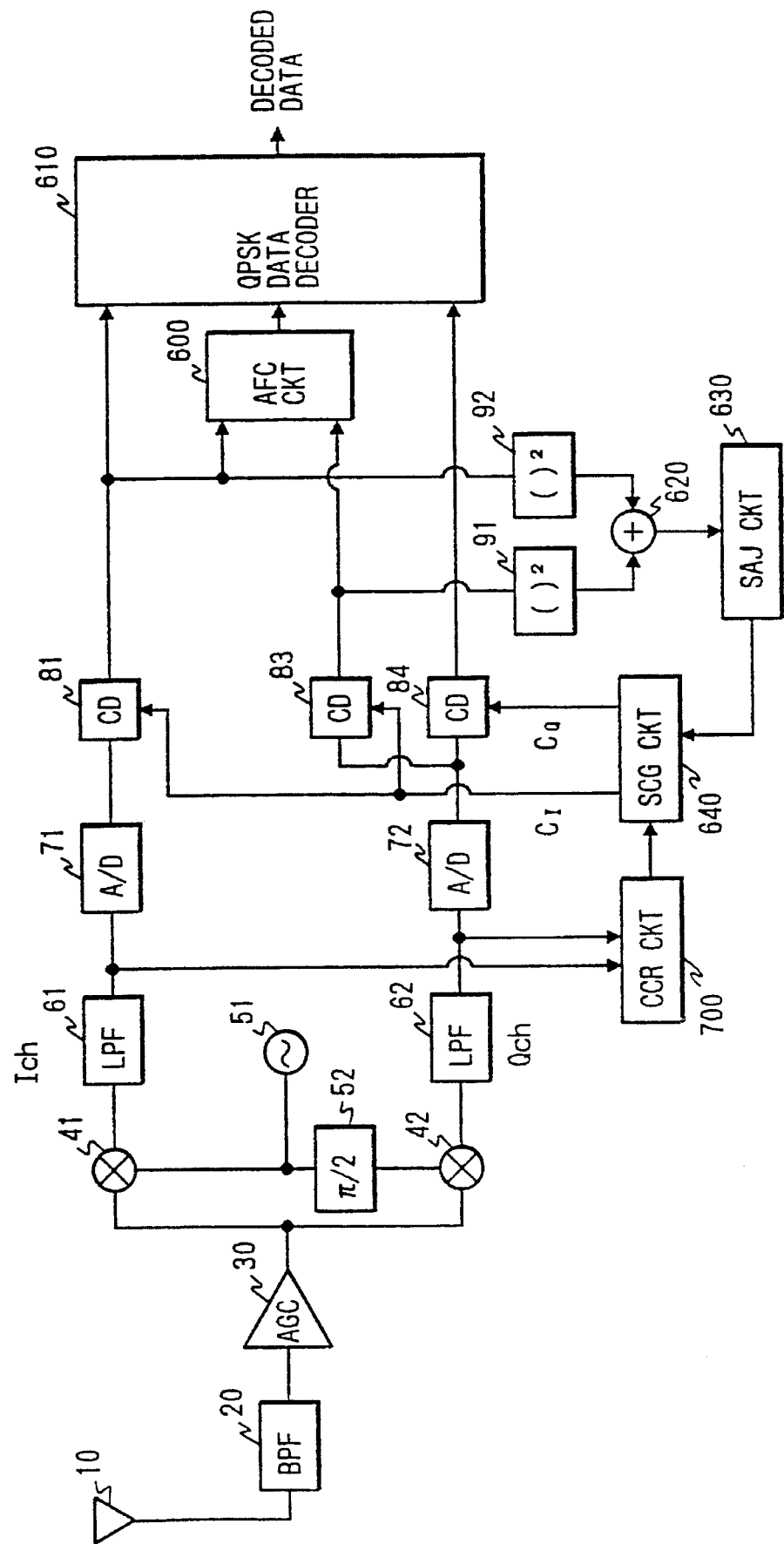
FIG. 6 is a schematic block diagram for illustrating the configuration of a primary part of another signal processing circuit embodying the present invention (namely, a second embodiment of the present invention)

FIG. 6 is a schematic block diagram for illustrating the configuration of a primary part (namely, synchronization acquisition and AFC circuits) of a signal processing circuit embodying the present invention (namely, the second embodiment of the present invention).

In this figure, reference numeral 10 designates a radio antenna; 20 a BPF; 30 an AGC circuit; 41 a down-mixer corresponding to the in-phase component (or channel) Ich of the signal; 42 a down-mixer corresponding to the quadrature component (or channel) Qch of the signal; 51 a local signal generator; 52 a ($\pi/2$)-phase shifter; 61 and 62 LPFs; 71 and 72 A/D converters; 81, 83 and 84 correlating detectors (namely, correlators) each for a de-spreading; 91 and 92 squaring devices; 600 an AFC circuit; 610 a data decoding circuit; 620 an adder; 630 a synchronization acquisition judgment circuit; 640 a spreading code generating circuit; and 700 a code clock recovery circuit. These composing elements of the second embodiment of the present invention are similar to the corresponding elements of the first embodiment of FIG. 5. The second embodiment of FIG. 6 is different from the first embodiment of FIG. 5 in that regarding the signal Qch, the correlation between this signal and each of the spreading codes $C_I$ and $C_Q$ is obtained, while only the correlation between the spreading code $C_I$ and the signal Ich is obtained, regarding the component Ich and that the correlating detector 82 and the adders 651 and 652 are removed from the configuration of FIG. 5.

Further, a synchronization acquisition judgment operation of the second embodiment of the present invention is similar to that of the first embodiment of the present invention. However, the calculation of the frequency offset to be effected upon completion of the synchronization acquisition is performed according to the equation (19). Thus, the AFC circuit obtains the value of the frequency offset $\Delta\omega$ from outputs of the correlators 81 and 83 and then sends the obtained value to the data decoding circuit 610 as correction value information. Subsequently, the data decoding circuit decodes data according to the outputs of the correlators 81 and 84 and the correction value information sent from the AFC circuit 610.

However, as the result of obtaining the correlation between the signal Qch and each of the spreading codes $C_I$ and $C_Q$ and the correlation between the spreading code $C_I$ and the signal Ich after the quadrature detection, and then calculating the frequency offset $\Delta\omega$ from the outputs of the correlators, effects similar to those of the first embodiment can be obtained. Namely, the influence of the frequency offset can be eliminated. Moreover, the configuration of the circuit can be simplified.

Incidentally, in case of the second embodiment, the correlation between the signal Qch and each of the spreading codes $C_I$ and $C_Q$ and the correlation between the spreading code $C_I$ and the signal Ich are obtained. However, instead of this, the correlation between the signal Ich and each of the spreading codes $C_I$ and $C_Q$ and the correlation between the spreading code $C_Q$ and the signal Qch may be obtained.

In addition, as can be understood from the facts that each of the first and second embodiments of the present invention employs the spreading code generating circuit, it is assumed that an active correlator is used as the correlating detector for a de-spreading. However, instead of such a correlator, another type correlator such as a matched filter may be used. Moreover, in cases of the first and second embodiments of the present invention, the A/D conversion is performed at the spreading code rate. However, the A/D conversion may be effected at another rate higher than the code spreading rate.

Furthermore, in cases of the first and second embodiments of the present invention, after the asynchronous quadrature detection, the frequency offset correction is effected by the AFC circuit when decoding data. However, because the value of the frequency offset $\Delta\omega$ is obtained as described above, AFC operation can be performed according to what is called a carrier recovery method in an absolute synchronization detection circuit.

Hereinafter, the third to eighth embodiments of the present invention will be described. Incidentally, in the descriptions of the third to eighth embodiments of the present invention, spreading code signals are indicated by "+1" and "−1". Further, when performing an A/D conversion, the center level of an input analog signal is assumed to be "0" and the analog input signal is converted into a "+" component (or digital signal) and a "−" component (or digital signal).

(Embodiment 3)

Hereunder, the third embodiment of the present invention will be described by referring to FIGS. 7, 8(*a*) and 8(*b*).

Figure 7:
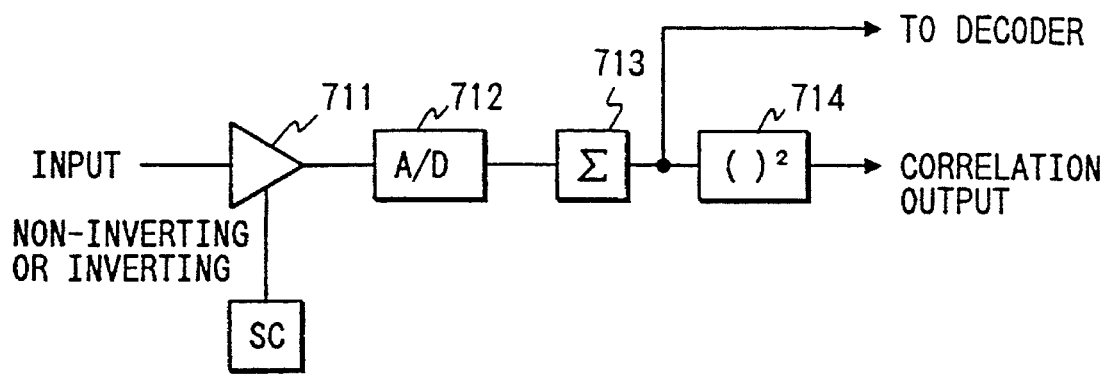
FIG. 7 is a schematic block diagram for illustrating the configuration of a digital correlator embodying the present invention (namely, a third embodiment of the present invention)

FIG. 7 illustrates the configuration of a digital correlator embodying the present invention (namely, the third embodiment of the present invention). Further, FIGS. 8(a) and 8(b) are timing charts for illustrating operations of the digital correlator of FIG. 7.

In FIG. 7, reference numeral 711 denotes an amplifier, the inverting or non-inverting of an input signal to which is controlled according to a spreading code signal; 712 an A/D converter; 713 an integrator for adding up outputs of the A/D converter 712 for a preliminarily set period of time; and 714 a squaring device for obtaining the square of an output of the integrator 713.

Hereinafter, operations of the digital correlator (namely, the third embodiment of the present invention) having the configuration described hereinabove will be described by referring to FIGS. 8(a) and 8(b). Further, FIG. 8(a) is a timing chart for illustrating an operation of this digital correlator in case where there is no correlation between a spreading code signal and an input signal inputted thereto. Moreover, FIG. 8(b) is a timing chart for illustrating an operation of this digital correlator in case where there is a correlation between a spreading code signal and an input baseband signal inputted thereto.

Figure 8A:
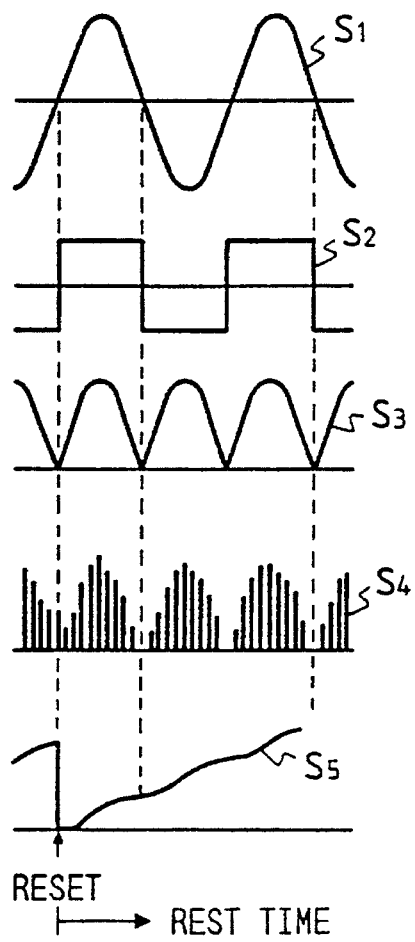
FIGS. 8(a) and 8(b) are timing charts each for illustrating an operation of the third embodiment of the present invention.
Figure 8B:
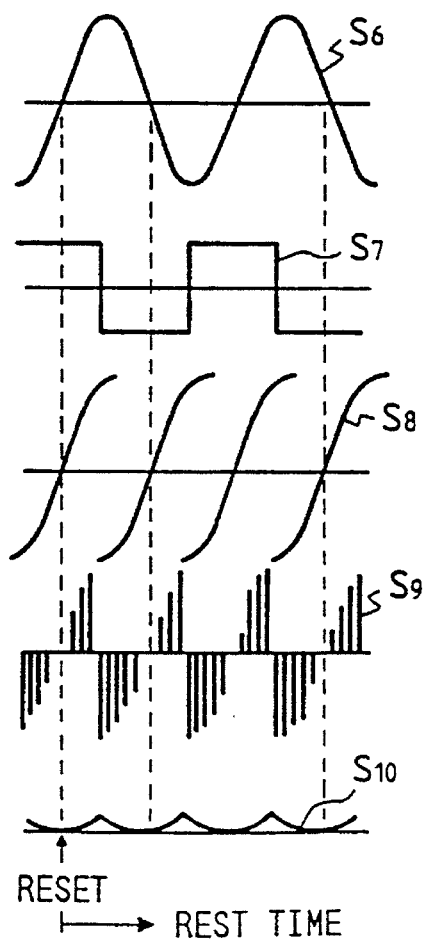

In FIG. 8(a), reference characters $S_1$ and $S_2$ designate an input baseband signal and a spreading code signal inputted to the amplifier 711. If the polarity of the spreading code signal is positive (+), an input signal of the amplifier 711 is not inverted. In contrast, if the polarity of the spreading code signal is negative (−), an input signal of the amplifier 711 is inverted as indicated by $S_3$ in this figure. Then, an A/D conversion is performed on such an input signal and as a consequence, a digital signal is obtained as indicated by $S_4$. Subsequently, the integrator 713 integrates this digital signal $S_4$ for a predetermined period of time (for example, one (data) symbol interval or one period of the spreading code signal). In case that there is a correlation between the digital (input) signal and the spreading code signal, an output of the integrator increases gradually in such a predetermined period of time, as indicated by a curve $S_5$. In contrast, in case where there is no correlation (or synchronism) between an input signal and a spreading code signal, as indicated by $S_6$ and $S_7$ in FIG. 8(b), the waveform of the input signal inverted according to the polarity of the spreading code signal becomes like a curve indicated by reference character $S_8$ in this figure. Further, as a result of an A/D conversion of such an input signal, a digital signal indicated by $S_9$ is obtained. Moreover, a signal representing the result of an integration of this digital signal becomes as indicated by $S_{10}$. Thus, in this case, an output of the integrator is not large. Incidentally, this figure illustrates a case that the polarity of a data signal (namely, the input signal) is positive (+). In contrast, in case where the polarity of the data signal is negative (−), an output of the integrator becomes negative. Thus, the correlation between the data signal (namely, the input signal) and the spreading code signal is obtained by calculating the square of an output of this integrator 713 by use of the squaring device 714. Incidentally, in case that there is a correlation between the data signal and the spreading code signal, an output of the integrator 713 can be used for decoding data. Thereby, a digital correlator with a simple configuration can be realized by performing the process described hereinbefore.

(Embodiment 4)

Hereinafter, the fourth embodiment of the present invention will be described by referring to FIGS. 9 and 10.

Figure 9:
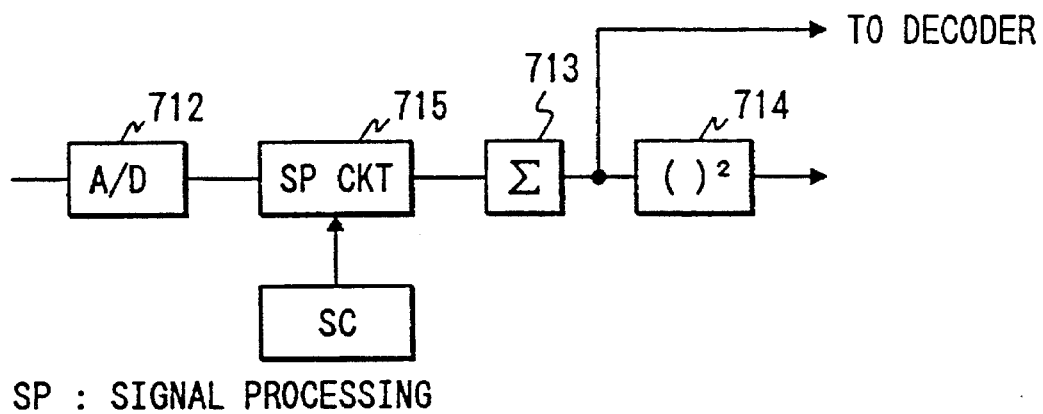
FIG. 9 is a schematic block diagram for illustrating the configuration of another digital correlator embodying the present invention (namely, a fourth embodiment of the present invention)

In FIG. 9, reference numerals 712, 713 and 714 designate an A/D converter, an integrator and a squaring device, respectively, similarly as in case of the third embodiment of the present invention. Further, reference numeral 715 denotes a signal processing circuit for inverting the polarity of an output of the A/D converter 712 according to the polarity (or sign) of the spreading code signal.

In case of this embodiment having such a configuration, an A/D conversion is performed on an analog input signal $S_{11}$ directly. As the result of the A/D conversion, a digital signal as indicated by $S_{13}$ in FIG. 10 is obtained. Then, an inverting or non-inverting of such an output signal of the A/D converter 712 is effected in the signal processing circuit 715 according to the polarity of the spreading code signal $S_{12}$. Therefore, an output signal of the signal processing circuit 715 becomes equivalent to a digital signal $S_{14}$ which would be obtained if an A/D conversion from the analog input signal to such a digital signal were performed. Subsequently, the integrator 713 integrates this digital signal and further the square of an output signal of the integrator 713 is obtained by the squaring device 714 to found a correlation value.

As described above, an inverting or non-inverting processing of an analog signal is not performed. Thus, the fourth embodiment of the present invention is advantageous to a conversion from an analog input signal to a digital signal.

(Embodiment 5)

Figure 11:
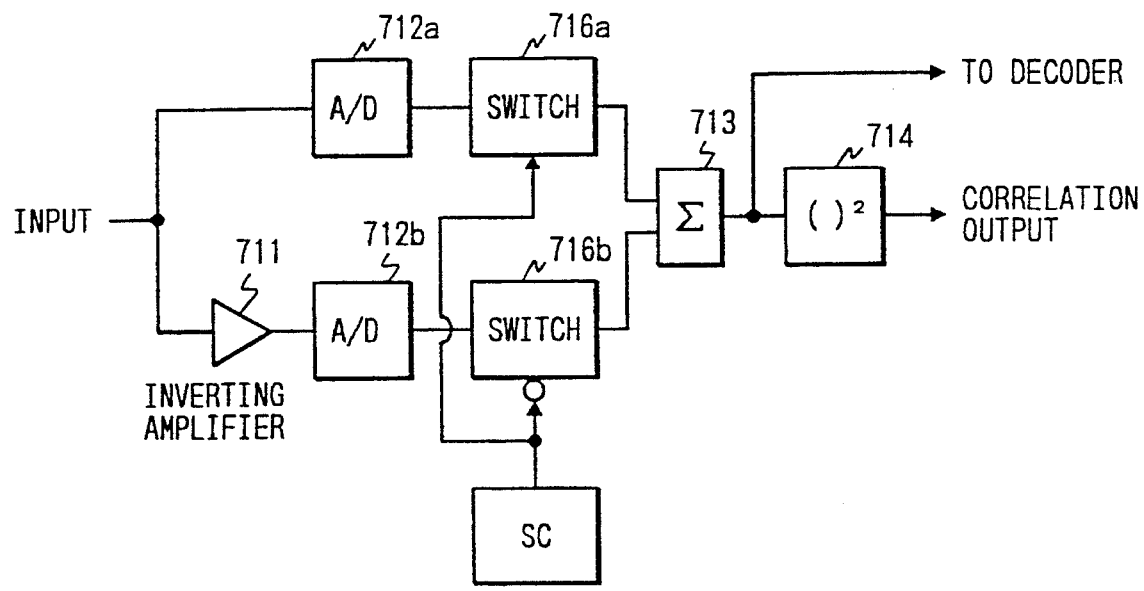
FIG. 11 is a schematic block diagram for illustrating the configuration of a further digital correlator embodying the present invention (namely, a fifth embodiment of the present invention)

Next, the fifth embodiment of the present invention will be described hereinbelow by referring to FIG. 11. As shown in this figure, this embodiment has two systems each consisting of an A/D converter 712 and a switch 716 which is constructed by a register practically. Further, the selection of one of signals respectively passing through these systems is according to the polarity of a spreading code signal. When the polarity of the spreading code signal is positive (+), the switch 716a is turned on and then the integrator 713 integrates a signal obtained as a result of an A/D conversion performed by the A/D converter 712a on an input signal which is not inverted. In contrast, when the polarity of the spreading code signal is negative (−), the switch 716b is turned on and then the integrator 713 integrates a signal obtained as a result of an A/D conversion performed by the A/D converter 712b on an inverted input signal sent thereto through an inverting amplifier 711, the gain of which is 1. Finally, a correlation value is obtained by calculating the square of an output of the integrator 713 by the squaring device 714. The correlation value obtained by this embodiment in this way is similar to that obtained by the fourth embodiment. However, in case of the fifth embodiment of the present invention, an inverting or non-inverting of an input signal is controlled by utilizing the turning-on and turning-off of the switches 716a and 716b instead of using an amplifier as in case of the third embodiment which uses the amplifier 711. Thus, timing operations in the correlator are simplified.

(Embodiment 6)

Figure 12:
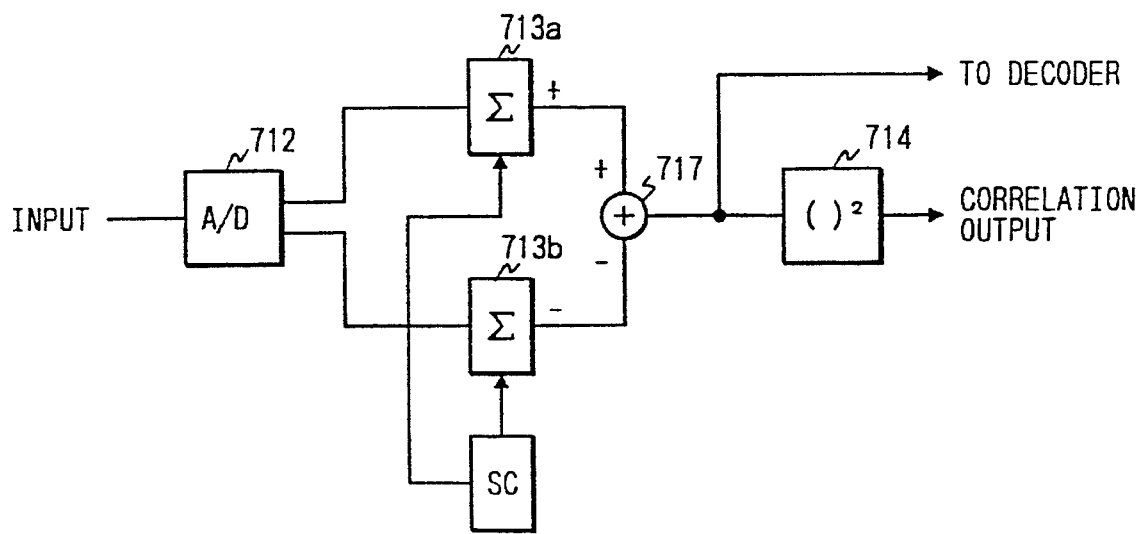
FIG. 12 is a schematic block diagram for illustrating the configuration of still another digital correlator embodying the present invention (namely, a sixth embodiment of the present invention)

Next, the sixth embodiment of the present invention will be described hereinbelow by referring to FIG. 12. As shown in this figure, two integrators 713a and 713b and an adder 717 are provided in this embodiment. Further, one of the integrators 713a and 713b are selected according to the polarity of a spreading code signal. Namely, when the polarity of the spreading code signal is positive (+), the integrator 713a is used to integrate a digital signal obtained by performing an A/D conversion of an analog input signal. In contrast, when the polarity of the spreading code signal is negative (−), the integrator 713b is used to integrate the digital signal. In this case, the adder 717 inverts an output of the integrator 713b. Finally, the squaring device 714 calculates the square of an output of the adder 717 to obtain a correlation value. In case of this embodiment, an operation of inverting the digital signal is carried out only once in each rest time. Thus, similarly as in case of the fifth embodiment, timing operations can be effected in the correlator easily.

(Embodiment 7)

Figure 13:
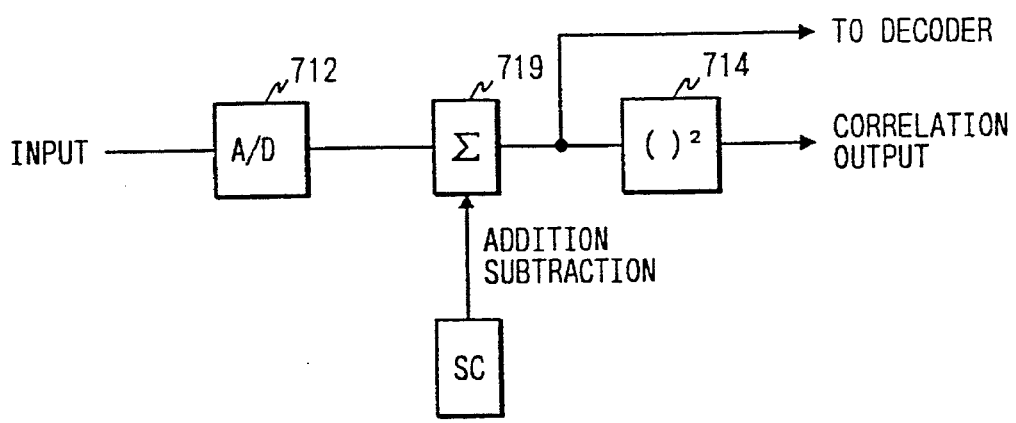
FIG. 13 is a schematic block diagram for illustrating the configuration of yet another digital correlator embodying the present invention (namely, a seventh embodiment of the present invention)

Next, the seventh embodiment of the present invention will be described hereinbelow by referring to FIG. 13. As is seen from this figure, an integrator 719 of the type being capable of performing addition and subtraction operations is employed in this embodiment in place of the type of the integrator 713a or 713b of the sixth embodiment. Thus, the integrator 719 integrates an input digital signal by changing an operation between an addition and a subtraction according to the polarity of the spreading code signal. Then, the squaring device 714 calculates the square of an output of the integrator 719 to obtain a correlation value. Although the seventh embodiment of the present invention requires the integrator 719 of the type being capable of performing addition and subtraction operations, the configuration of this embodiment is very simple.

(Embodiment 8)

Figure 14:
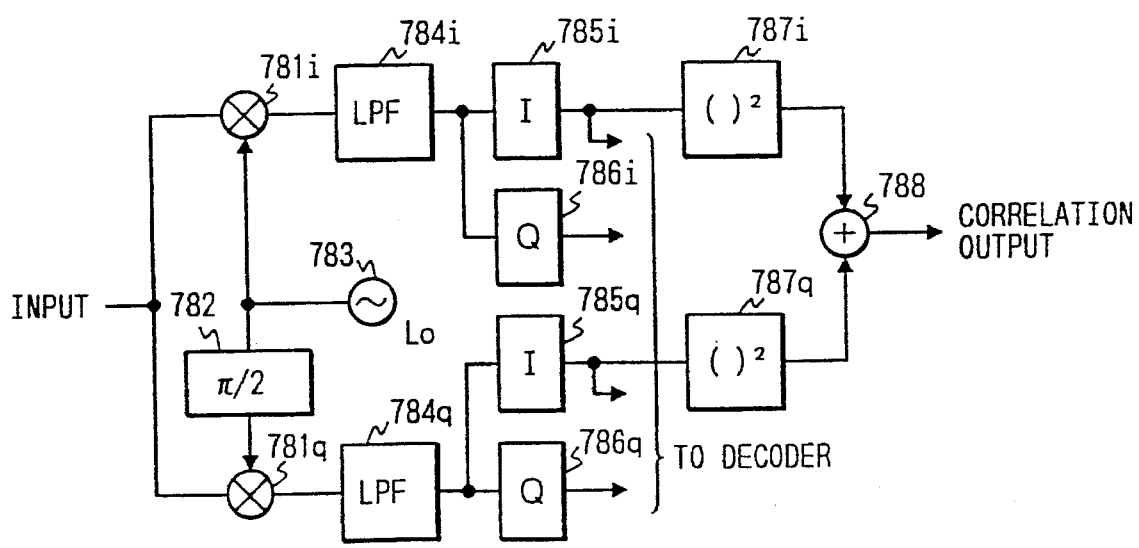
FIG. 14 is a schematic block diagram for illustrating the configuration of a part of a receiving circuit of a spread spectrum communication system of the DS type employing a QPSK, which is provided with digital correlators of the present invention (namely, an eighth embodiment of the present invention)

Next, the eighth embodiment of the present invention will be described hereinbelow by referring to FIG. 14. This figure illustrates a part of a receiving circuit of the spread spectrum communication system of the DS type employing a modulation method such as a QPSK modulation method by which input signals are mapped onto a phase plane. In this figure, reference numerals 781$_i$ and 781$_q$ designate frequency converters corresponding to the in-phase component I and the quadrature component Q, respectively; 783 a local oscillator; 784$_i$ and 784$_q$ LPFs corresponding to the in-phase component I and the quadrature component Q, respectively; 785$_i$ a digital correlator for obtaining a correlation between the in-phase component I of a signal transmitted from a transmission unit and the spreading code signal corresponding to the in-phase component I of a signal received by a receiving unit; 785$_q$ a digital correlator for obtaining a correlation between the in-phase component I of a signal transmitted from a transmission unit and the spreading code signal corresponding to the quadrature component Q of a signal received by a receiving unit; 786$_i$ a digital correlator for obtaining a correlation between the quadrature component Q of a signal transmitted from a transmission unit and the spreading code signal corresponding to the in-phase component I of a signal received by a receiving unit; 786$_q$ a digital correlator for obtaining a correlation between the quadrature component Q of a signal transmitted from a transmission unit and the spreading code signal corresponding to the quadrature component Q of a signal received by a receiving unit; 787$_i$ a squaring device for obtaining the square of the value of the correlation between the in-phase component I of a signal transmitted from a transmission unit and the spreading code signal corresponding to the in-phase component I of a signal received by a receiving unit; 787$_q$ a squaring device for obtaining the square of the value of the correlation between the in-phase component I of a signal transmitted from a transmission unit and the spreading code signal corresponding to the quadrature component Q of a signal received by a receiving unit; 782 a phase shifter for shifting the phase of a signal sent from the local oscillator 783 by ($\pi/2$); and 788 an adder.

Figure 2A:
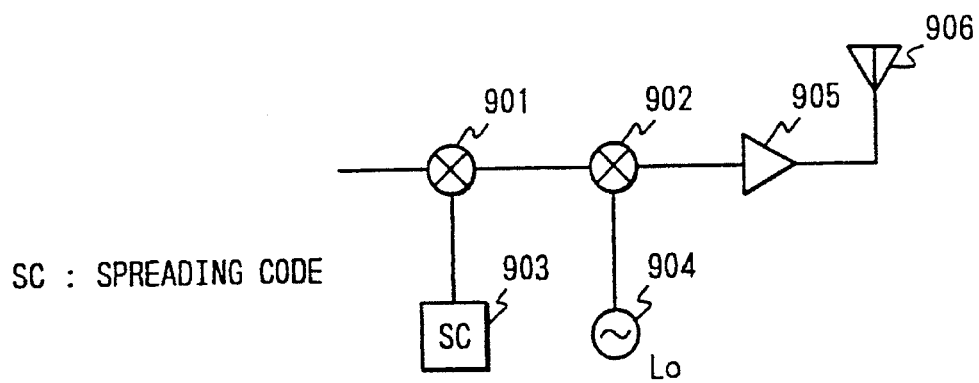
FIG. 2(a) is a schematic block diagram for illustrating the configuration of a spreading circuit of a conventional spread spectrum communication system.
Figure 2B:
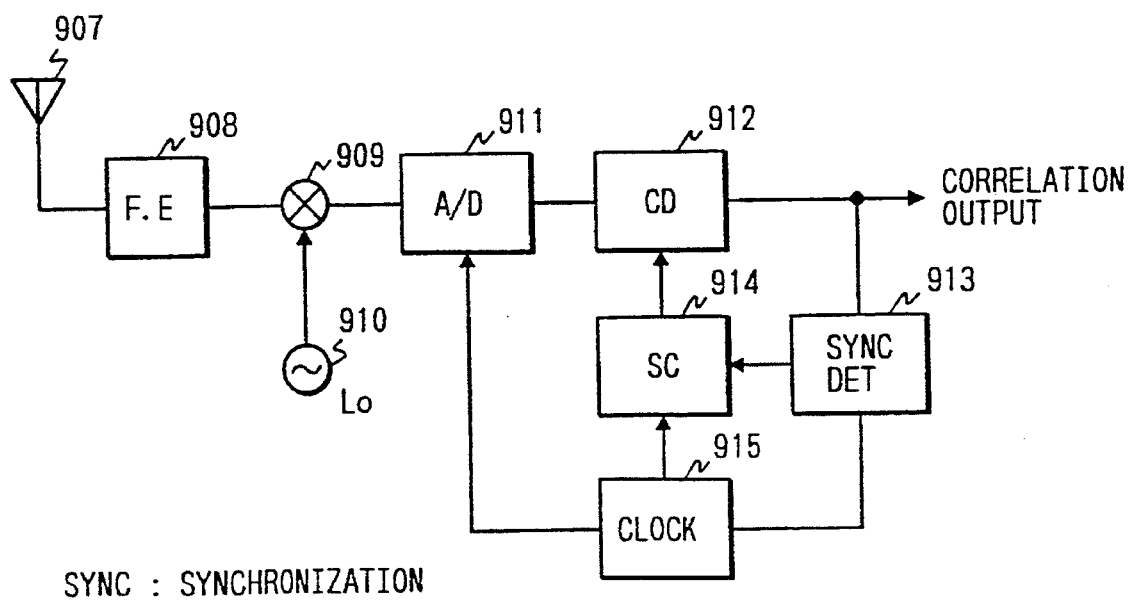
FIG. 2(b) is a schematic block diagram for illustrating the configuration of a de-spreading circuit of the conventional spread spectrum system of FIG. 2(a)
Figure 3:
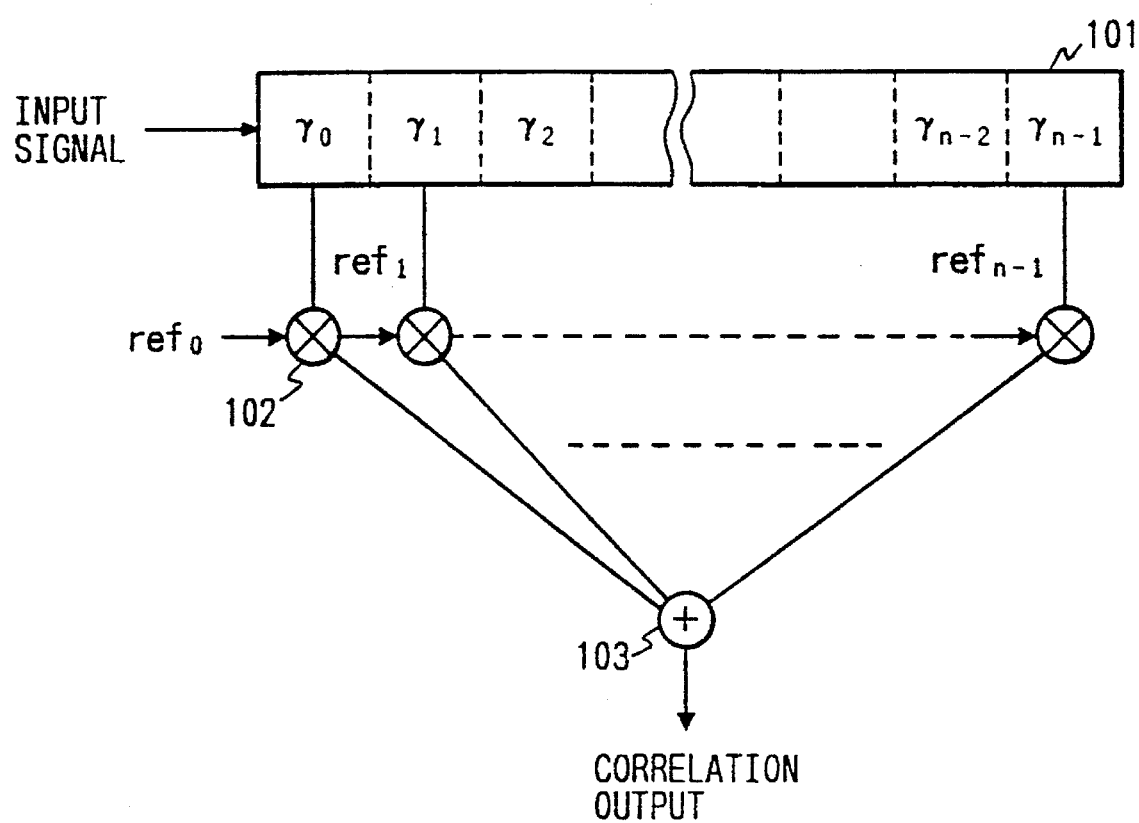
FIG. 3 is a detail block diagram for illustrating the configuration of a conventional correlator which employs a digital matched filter practically.

In the circuit having the configuration described hereinabove, a signal received by a front-end portion of the receiving unit is first processed to increase the signal level thereof to a necessary level. Then, the received signal is inputted to the frequency converters 781$_i$ and 781$_q$ which convert the inputted signal into baseband signals corresponding to the components I and Q, respectively. Thereafter, the baseband signal corresponding to the components I is inputted through the LPF 784$_i$ to the digital correlators 785$_i$ and 786$_i$ which employ one of methods of the third to seventh embodiments. Further, the baseband signal corresponding to the components Q is inputted through the LPF 784$_q$ to the digital correlators 785$_q$ and 786$_q$ which employ one of methods of the third to seventh embodiments. Incidentally, for instance, the correlator 785i finds the correlation between the baseband signal obtained by the frequency converter 781i and the spreading code signal corresponding to the component I of a signal transmitted from the transmitting unit. Generally, it is often that the frequency of a local oscillator of a transmitting unit (for example, in case of the conventional system, the local oscillator 904 of FIG. 2(a)) is not precisely equal to that of a local oscillator of a receiving unit (for instance, in case of the conventional system, the local oscillator 910 of FIG. 2(b)). Therefore, in case of the system of FIG. 14, on a phase plane, a signal output mapped thereto rotates around the origin thereof. Thus in case that only one correlator is used correspondingly to each of the components I and Q, outputs of the correlators fluctuate and can not be obtained stably. However, this problem can be solved by providing two correlators, which correspond to the spreading code signals corresponding to the in-phase and quadrature components I and Q, respectively, correspondingly to each of the baseband signals I and Q and then adding up the squares of outputs of the correlators respectively obtaining the correlations between one I or Q of the components of a signal transmitted from a transmission unit and the spreading code signal corresponding to the in-phase component I of a signal received by a receiving unit and the correlation between the same one of the components of the signal transmitted from the transmission unit and the spreading code signal corresponding to the in-phase component Q of the signal received by the receiving unit. Thereby, outputs of the correlators can be obtained stably. In case of the circuit of FIG. 14, an correlation output corresponding to the spreading code signal which corresponds to the in-phase component I of a signal transmitted from the transmitting unit is obtained by using the adder 786 for adding up the square of an output of the correlator 785i, which is calculated by the squaring device 787i, and the square of an output of the correlator 785q, which is calculated by the squaring device 787q. Further, note that similarly, an correlation output corresponding to the spreading code signal which corresponds to the quadrature component Q of a signal transmitted from the transmitting unit is obtained by using the adder 786 for adding up the square of an output of the correlator 786i and the square of an output of the correlator 786q and that a synthetic correlation output can be obtained by using both of the correlation outputs corresponding to the spreading code signals which correspond to the components I and Q (for example, averaging these correlation outputs). Moreover, any one of the third to seventh embodiments may be used as each of the correlators of the eighth embodiment. Thereby, the configuration of the circuit of the eighth embodiment of the present invention can be extremely simplified.

Figure 10:
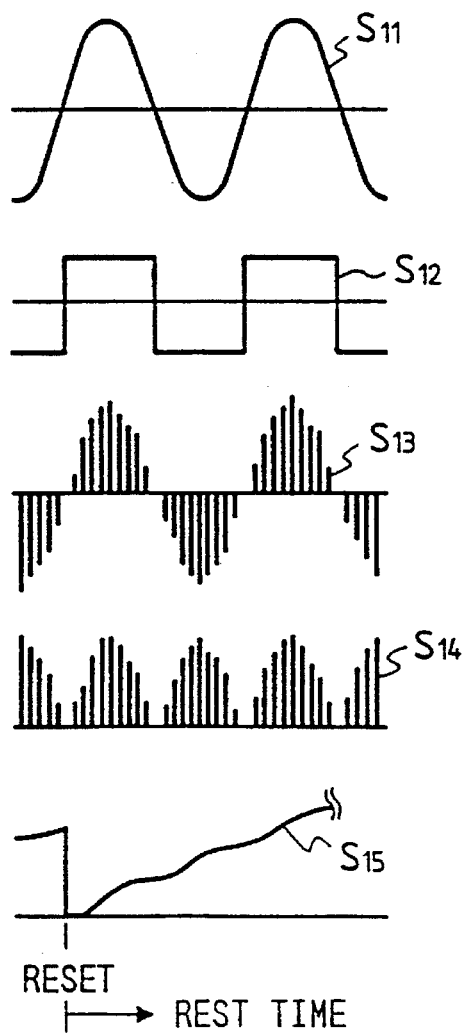
FIG. 10 is a timing chart for illustrating an operation of the third embodiment of the present invention.

Incidentally, in the foregoing descriptions of the third to eighth embodiments of the present invention, the sampling number is 10 per one period of the spreading code signal (as illustrated in FIGS. 8(a), 8(b) and 10). However, another sampling number (for instance, 1 or 2 per one period of the spreading code signal) may be used to obtain similar correlation value.

(Embodiment 9)

Hereinafter, a ninth embodiment of the present invention will be described hereinbelow by referring to the accompanying drawings.

Figure 15A:
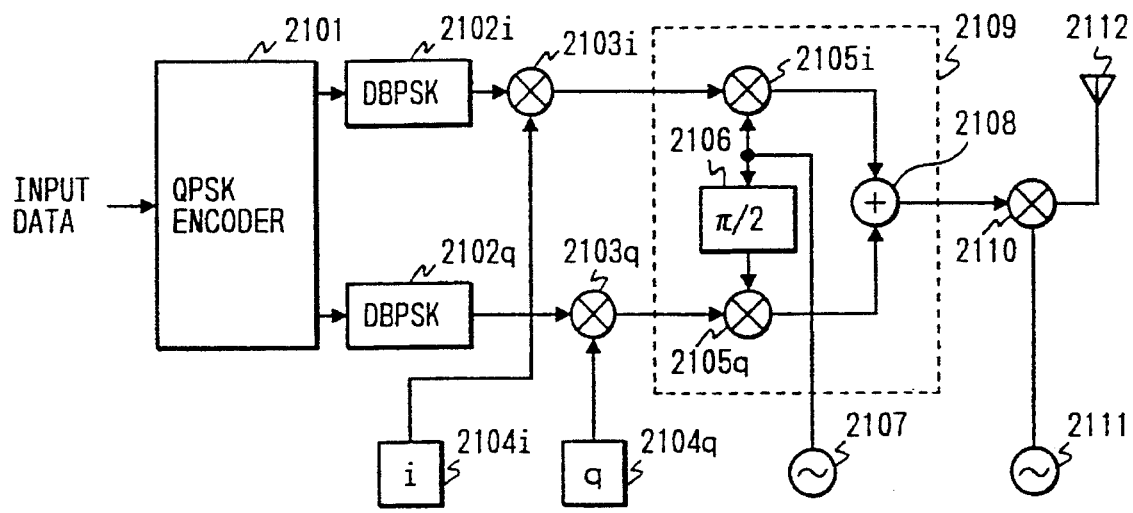
FIG. 15(a) is a schematic block diagram for illustrating the configuration of a transmitting circuit of a spread spectrum communication system of the DS type according to an M-PSK modulation method of the present invention, which is a ninth embodiment of the present invention.

FIG. 15(a) is a schematic block diagram for illustrating the configuration of a transmitting circuit (namely, a spreading portion) of a spread spectrum communication system of the DS type according to an M-PSK modulation method of the present invention (namely, the ninth embodiment of the present invention). Further, FIG. 15(b) is a schematic block diagram for illustrating the configuration of a receiving circuit (namely, a de-spreading portion) of the spread spectrum communication system of the DS type of FIG. 15(a).

In FIG. 15(a), reference numeral 2101 denotes an encoder for converting an input signal into data sequences corresponding to two symbols or components I and Q, respectively; 2102i a differential encoders for performing a differential encoding of the data sequence corresponding to the symbol I, which is outputted by the encoder 2101; 2102q a differential encoders for performing a differential encoding of the data sequence corresponding to the symbol Q, which is outputted by the encoder 2101; 2103i a multiplier (or mixer) for mixing an output signal of the differential encoder 2102i with a spreading code signal sent from a spreading code generator 2104i; 2103q a multiplier (or mixer) for mixing an output signal of the differential encoder 2102q with a spreading code signal sent from a spreading code generator 2104q; 2109 a quadrature modulation portion comprised of a multiplier 2105i for mixing an output signal of the multiplier 2103i with a signal sent from a first local oscillator 2107, a multiplier 2105q for mixing an output signal of the multiplier 2103q with a signal received through a ($\pi/2$)-phase-shifter 2106 from the first local oscillator 2107 and an adder 2108 for adding outputs of the multipliers 2105i and 2105q; 2110 a multiplier for mixing an output of the quadrature modulation portion 2109 with a signal sent from a second local oscillator 2111; and 2112 an antenna.

In the circuit with the configuration of this figure, an input signal is first inputted to the encoder 2101 for mapping the input signal onto a symbol signal used for a QPSK modulation, whereupon the input signal is converted into the data sequences corresponding to the two symbols I and Q, respectively. Then, these data sequences corresponding to I and Q undergo differential encoding operations in the differential encoders 2102i and 2102q, respectively. Subsequently, an output of the differential encoder 2102i is multiplied by a corresponding spreading code signal, which is sent from the spreading code generator 2104i, in the modulo-2 multiplier 2103i. Similarly, an output of the differential encoder 2102q is multiplied by a corresponding spreading code signal, which is sent from the spreading code generator 2104q, in the modulo-2 multiplier 2103q. Then, outputs of the multipliers 2103i and 2103q are sent to the quadrature modulation portion 2109. Further, in the quadrature modulation portion 2109, the output of the multiplier 2103i is mixed with a signal sent from the first local oscillator 2107 in the mixer 2105i. Moreover, the output of the multiplier 2103q is mixed in the mixer 2105q with a signal sent from the first local oscillator 2107, the phase of which is shifted by ($\pi/2$) by the ($\pi/2$)-phase shifter 2106. Incidentally, the modulation method employed at that time is the DBPSK modulation to be performed on a quadrature phase plane. Then, outputs of the mixers 2105i and 2105q are added together by the adder 2108. Further, the spectrum of an output signal of the adder 2108 is similar to that of a signal obtained as a result of a QPSK modulation. Thereafter, the output signal of the adder 2108 is converted by the mixer 2110 into a signal of a carrier band by using a signal sent from the second local oscillator 2111. Then, the signal of a carrier band is transmitted from the antenna 2112.

Figure 15B:
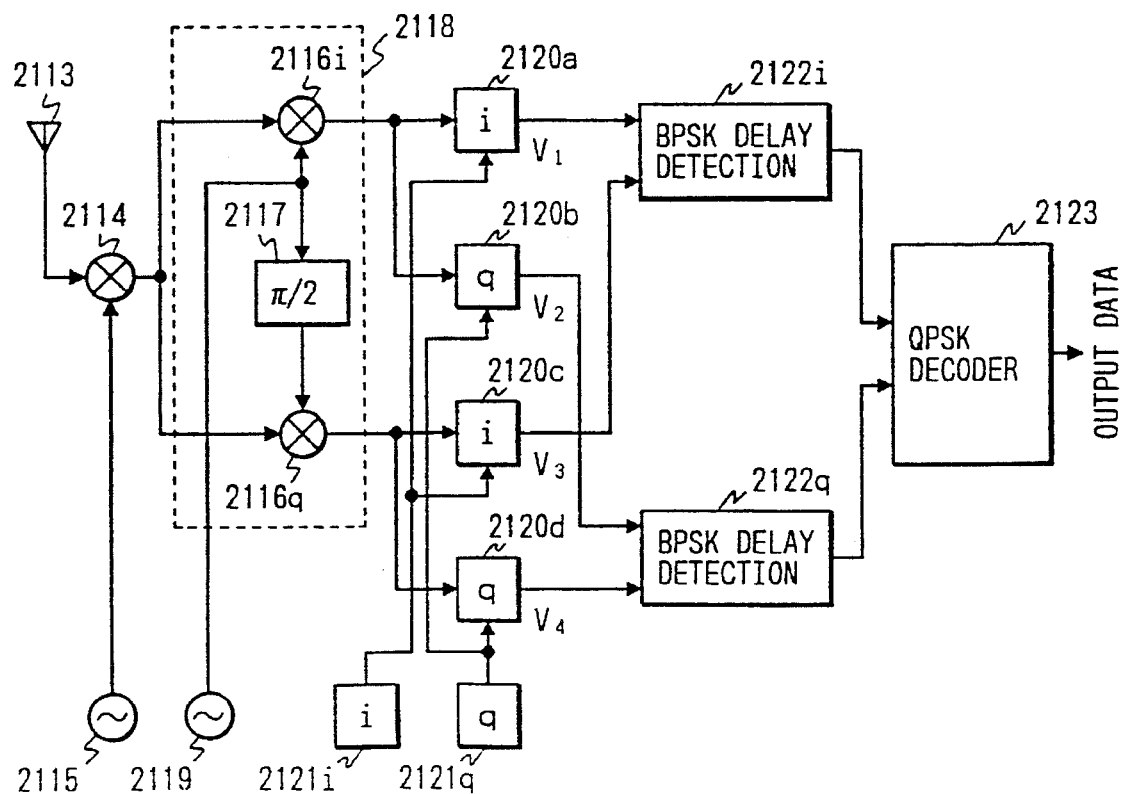
FIG. 15(b) is a schematic block diagram for illustrating the configuration of a receiving circuit of the spread spectrum communication system of the DS type of FIG. 15(a)

On the other hand, in FIG. 15(b), reference numeral 2113 designates an antenna for receiving the signal transmitted from the antenna 2112; 2114 a multiplier for mixing an input signal, which is received from the antenna 2113 and should be modulated, with a signal sent from a first local oscillator 2115; 2118 a quadrature detection portion consisting of a multiplier 2116i for mixing an output of the multiplier 2114 with a signal sent from a second local oscillator 2119 and a multiplier 2116q for mixing an output of the multiplier 2114 with a signal sent through a ($\pi/2$)-phase shifter 2117 from the second local oscillator 2119; 2120a to 2120d correlators for obtaining the correlations between one of outputs of the multipliers 2116i and 2116q and each of the spreading code signals 2121i and 2121q and between the other of outputs of the multipliers 2116i and 2116q and each of the spreading code signals 2121i and 2121q; 2122i and 2122q BPSK delay detection portions; and 2123 a QPSK decoder.

In the receiving circuit of FIG. 15(b) having the configuration described hereinabove, first, a signal of an intermediate frequency band, which is obtained by the mixer 2114, is converted by the quadrature detection portion 2118 into a signal of a baseband. Thereafter, data signals are obtained by using the four correlators 2120a to 2120d. In case of this circuit, the BPSK delay detection is performed by the BPSK delay detection circuit 122i by using an output $V_1$ of the correlator 2120a and an output $V_3$ of the correlator 2120c. Simultaneously, the BPSK delay detection is also performed by the BPSK delay detection circuit 122q by using an output $V_2$ of the correlator 2120b and an output $V_4$ of the correlator 2120d. Thus, a signal representing the data sequence corresponding to the component I and another signal representing the data sequence corresponding to the component Q are detected. At that time, outputs of the correlators vary as the "phase rotation" due to the frequency offset increases. Therefore, the detection is effected by changing the outputs of the correlators, for instance, between $V_1$ and $V_3$. Thereafter, transmission data is decoded by using the QPSK decoder 2123.

As described above, in case of this embodiment, the transmission data is transmitted and received similarly as in case of employing a QPSK modulation. However, the detection method effected in this embodiment practically is the quadrature multiplex DBPSK modulation. Thus, this embodiment has an advantageous effect in that the system is resistant to the influence of the frequency offset, in comparison with the conventional system employing the QPSK modulation.

(Embodiment 10)

hereinafter, the tenth embodiment of the present invention will be described by referring to FIGS. 16(a) and 16(b).

Figure 16A:
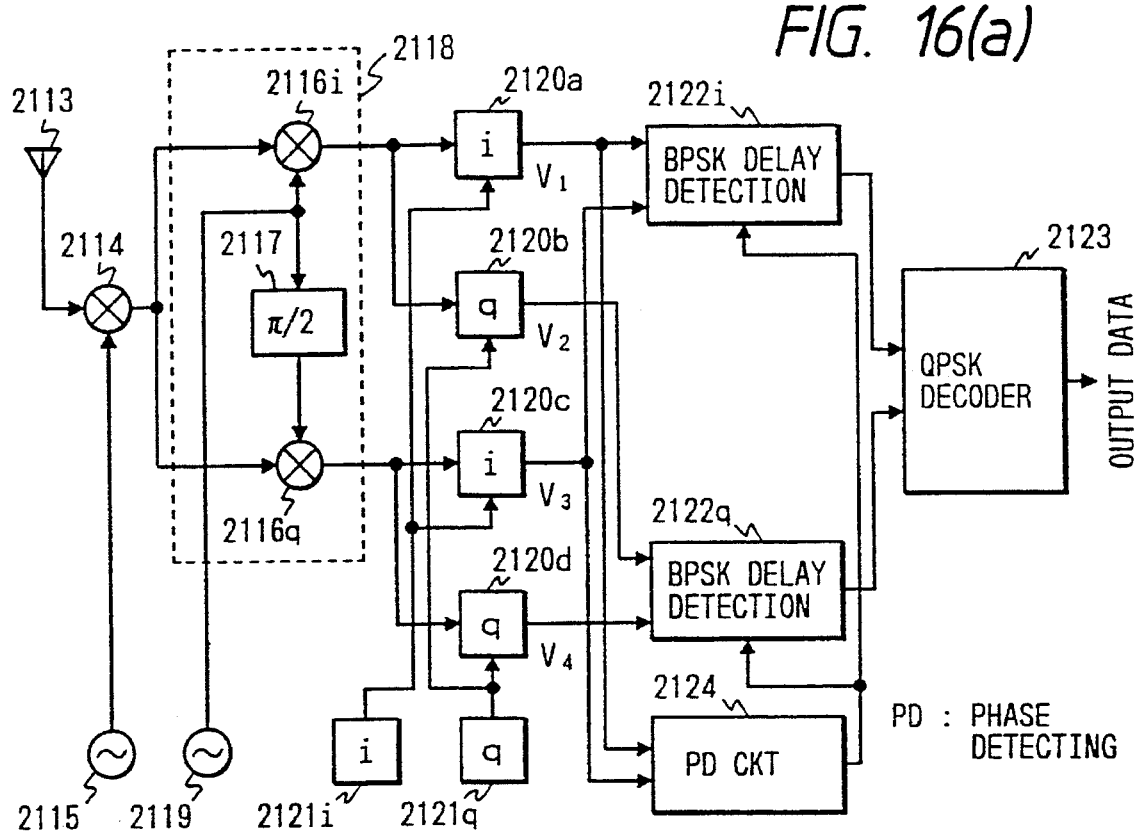
FIG. 16(a) is a schematic block diagram for illustrating the configuration of a receiving circuit of a spread spectrum communication system of the DS type according to another M-PSK modulation method of the present invention, which is a tenth embodiment of the present invention.

FIG. 16(a) illustrates the configuration of a receiving portion of a spread spectrum communication system of the DS type corresponding to the QPSK modulation similarly to that of the ninth embodiment of FIG. 15(a). The receiving portion of the tenth embodiment is different from that of the ninth embodiment in that the tenth embodiment is provided with a frequency offset compensation circuit.

Namely, the receiving circuit of the tenth embodiment of the present invention is provided with a phase detecting circuit 2124 for detecting an angle of the "phase rotation". In case of the circuit of FIG. 16(a), after the calculation of angle of the "phase rotation", the compensation of the phase is effected at the time of performing a BPSK delay detection. Further, FIG. 16(b) illustrates a modification of the receiving circuit of the tenth embodiment of FIG. 16(a). This modification of the receiving circuit controls the oscillation frequency of a first local oscillator (namely, suppresses increase of the oscillation of the first local oscillator) to make a compensation for the frequency offset. Further, both of the receiving circuits of FIGS. 16(a) and 16(b) can perform the compensation of the frequency offset over a wider range thereof.

Figure 16B:
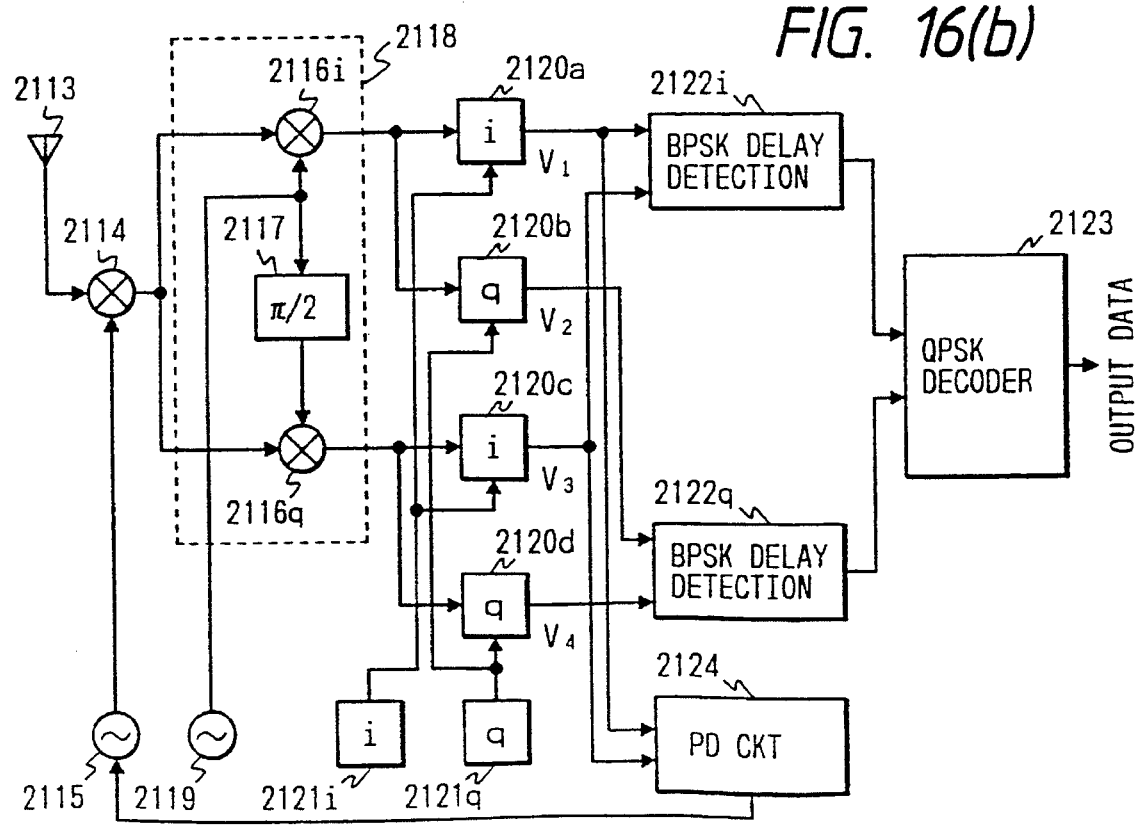
FIG. 16(b) is a schematic block diagram for illustrating the configuration of a modification of the receiving circuit of the spread spectrum communication system of the DS type of FIG. 16(a)

Incidentally, in case of the modification illustrated in FIG. 16(b), the first local oscillator 2115 is controlled. However, if a second local oscillator 2119 is controlled instead of the first local oscillator 2115, similar effects can be obtained.

(Embodiment 11)

Hereinafter, the eleventh embodiment of the present invention will be described by referring to FIGS. 17(a) and 17(b).

Figure 17A:
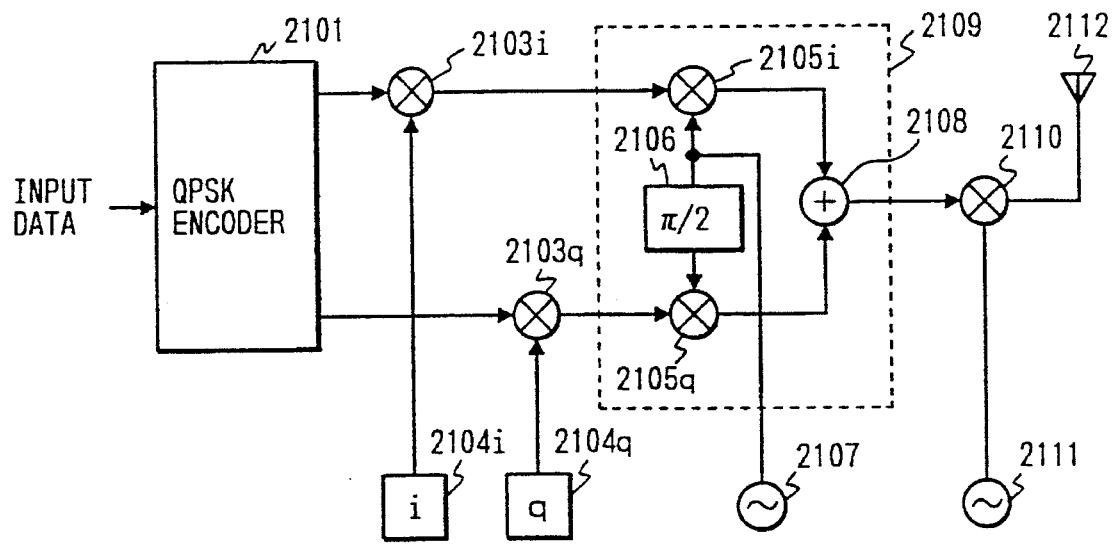
FIG. 17(a) is a schematic block diagram for illustrating the configuration of a transmitting circuit of a spread spectrum communication system of the DS type according to a further M-PSK modulation method of the present invention, which is an eleventh embodiment of the present invention.

FIG. 17(a) is a schematic block diagram for illustrating the configuration of a transmitting circuit of a spread spectrum communication system of the DS type according to a further M-PSK modulation method of the present invention (namely, the eleventh embodiment of the present invention). Further, FIG. 17(b) is a schematic block diagram for illustrating the configuration of a receiving circuit of the spread spectrum communication system of the DS type of FIG. 17(a).

Figure 4A:
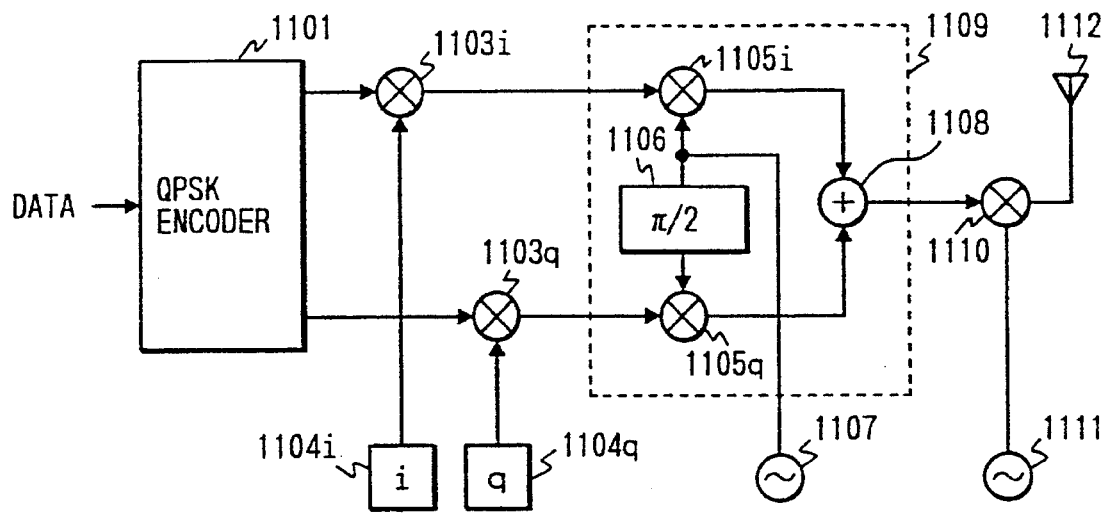
FIG. 4(a) is a schematic block diagram for illustrating the transmitting unit of a conventional spread spectrum communication system of the direct sequence type that employs a QPSK.
Figure 4B:
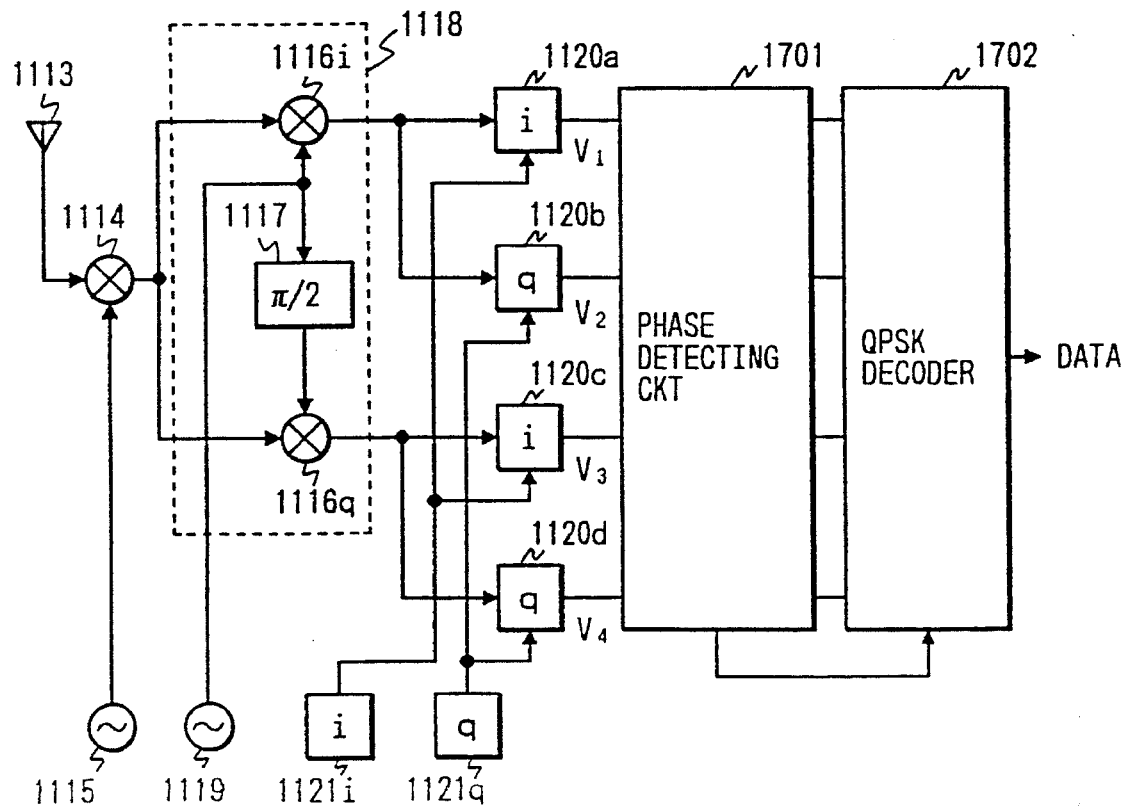
FIG. 4(b) is a schematic block diagram for illustrating the receiving unit of the conventional spread spectrum communication system of FIG. 4(a)

The configuration and operation of the transmitting circuit of FIG. 17(a) are similar to those of the transmitting circuit of the conventional system of FIG. 4(a). Thus the descriptions of the configuration and operation of the transmitting circuit of FIG. 17(a) are omitted herein for the simplicity of description.

Figure 17B:
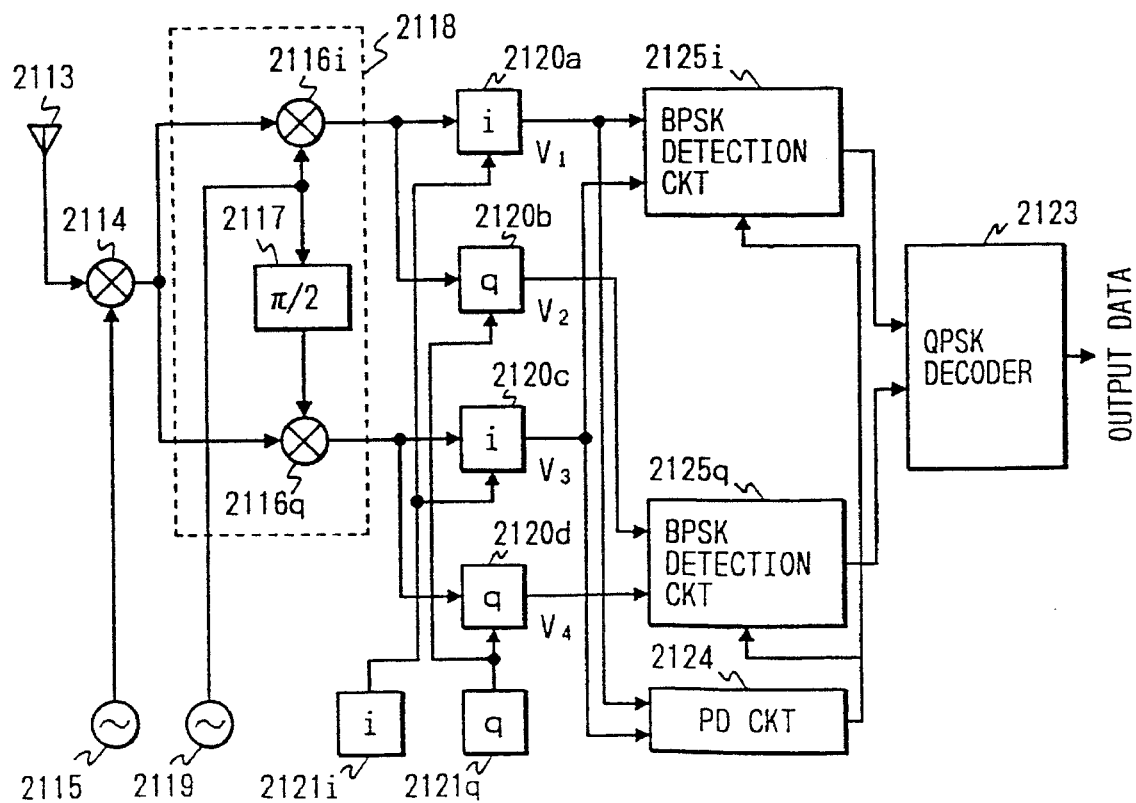
FIG. 17(b) is a schematic block diagram for illustrating the configuration of a receiving circuit of the spread spectrum communication system of the DS type of FIG. 17(a)

Further, the configuration of the receiving circuit of FIG. 17(b) is similar to that of the receiving circuit of the tenth embodiment of FIG. 16(a). In case of the receiving circuit of FIG. 17(b), when decoding data, a BPSK detection is first performed on a received signal by using spreading code signals corresponding to the components I and Q of a signal transmitted by the transmitting circuit. Then, a QPSK decoding is performed on a result of the BPSK detection. Further, an angle of the "phase rotation" is detected by a phase detecting circuit 2123 by using an output of a correlator 2120. Then, a phase compensation is effected by a BPSK detection circuit 2125 as a frequency offset compensation.

Additionally, if the frequency offset compensation is effected by controlling the oscillation frequency of the second local oscillators 2115 and 2119 according to output signals of a phase detecting circuit 2124 (however, such an arrangement is not shown in FIG. 17(b)) as in case of the tenth embodiment of the present invention, similar effects can be obtained.

(Embodiment 12)

Hereinafter, the twelfth embodiment of the present invention will be described by referring to FIGS. 18(a) and 18(b).

Figure 18A:
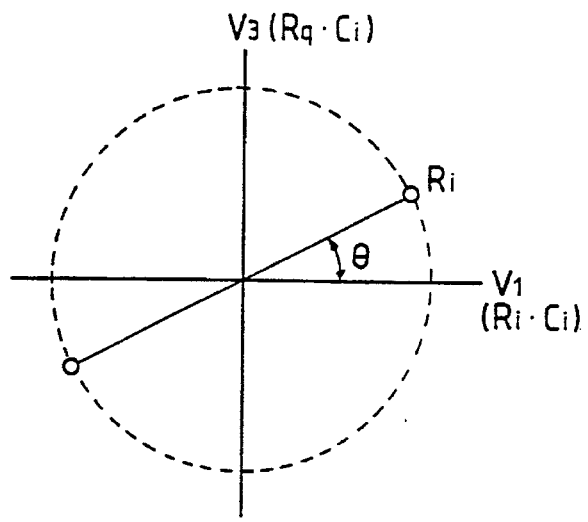
FIG. 18(a) is a diagram for illustrating a method for compensating a frequency offset in an M-PSK modulation system of the present invention.
Figure 18B:
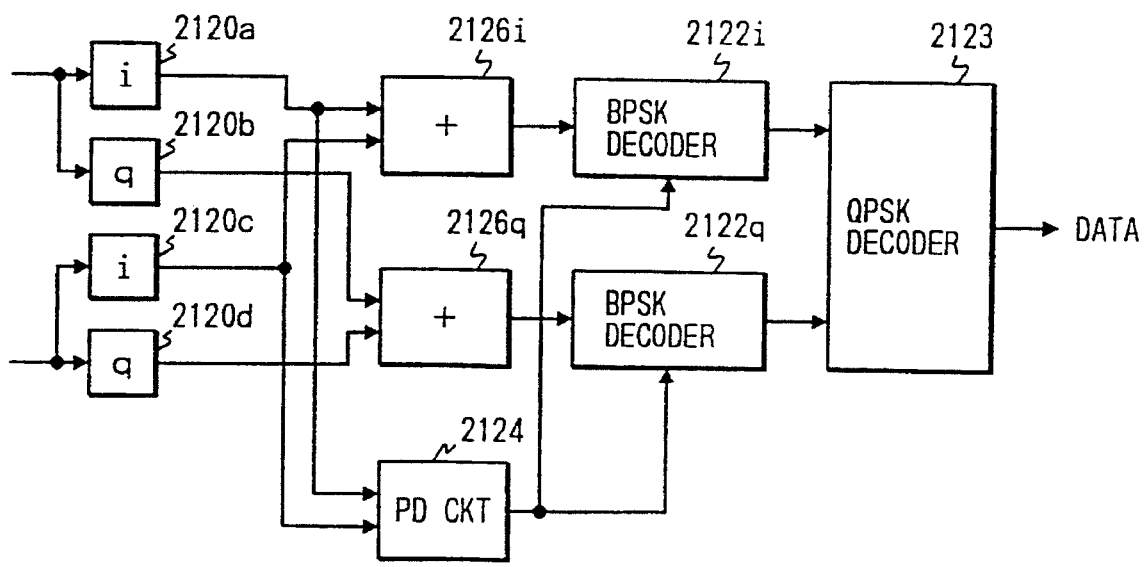
FIG. 18(b) is a schematic block diagram for illustrating the configuration of a receiving circuit of a spread spectrum communication system of the DS type according to still another M-PSK modulation method of the present invention, which is a twelfth embodiment of the present invention.

FIGS. 18(a) and 18(b) are diagrams for illustrating a method for a frequency offset compensation. Namely, FIG. 18(a) is a diagram for illustrating the "phase rotation" of an output of a correlator corresponding to the spreading code (i) which corresponds to the component I. FIG. 18(b) is a schematic block diagram for illustrating the configuration of a receiving circuit (namely, a decoding portion) of a spread spectrum communication system of the DS type for performing a phase compensation.

In FIG. 18(a), X-axis (namely, the horizontal axis) and Y-axis (namely, the vertical axis) are the output V1 of the correlator 120a and that V3 of the correlator 120b. Further, a point Ri represents the output of the correlator corresponding to the spreading code (i). Moreover, an angle $\theta$ is an absolute phase angle (namely, angle of phase, which formed by V1-axis (namely, X-axis) and a segment drawing from the origin to Ri). The phase detecting devices 2124 of the tenth and eleventh embodiments detect this angle and calculates an amount of the "phase rotation" (namely, the angular displacement). However, if this angle is ($\pi/2$), the output V1 becomes equal to "0". Thus it is necessary for effecting the decoding to use output signals of the other correlators according to circumstances and on predetermined conditions. To solve this problem, in case the twelfth embodiment of the present invention, output signals of the correlators of each pair are added together and signals obtained as the result of the additions are used for decoding.

FIG. 18(b) is a schematic block diagram of the configuration of the receiving circuit including the correlators 120a to 120d and so forth. Further, the twelfth embodiment is different from the ninth embodiment in that adders 2126i and 2126q are provided prior to BPSK delay detection portions 2122i and 2122q, respectively. Thereby, in case of the twelfth embodiment, it becomes unnecessary for decoding to use output signals of the correlators according to circumstances and on predetermined conditions. Moreover, the configuration of the receiving circuit can be further simplified.

Figure 19A:
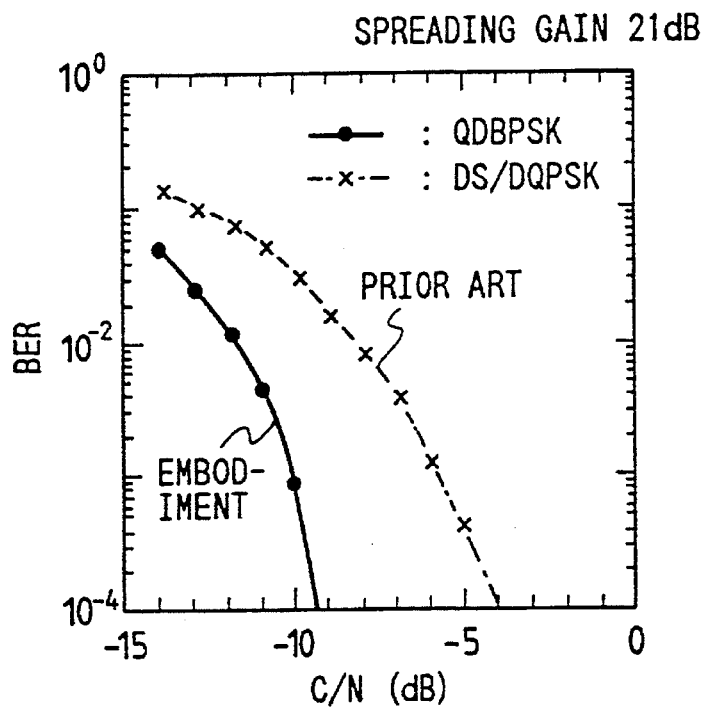
FIG. 19(a) is a graph for showing C/N-BER characteristics (namely, the relation between the carrier-to-noise-ratio and the bit error rate) of the eleventh embodiment of the present invention.
Figure 19B:
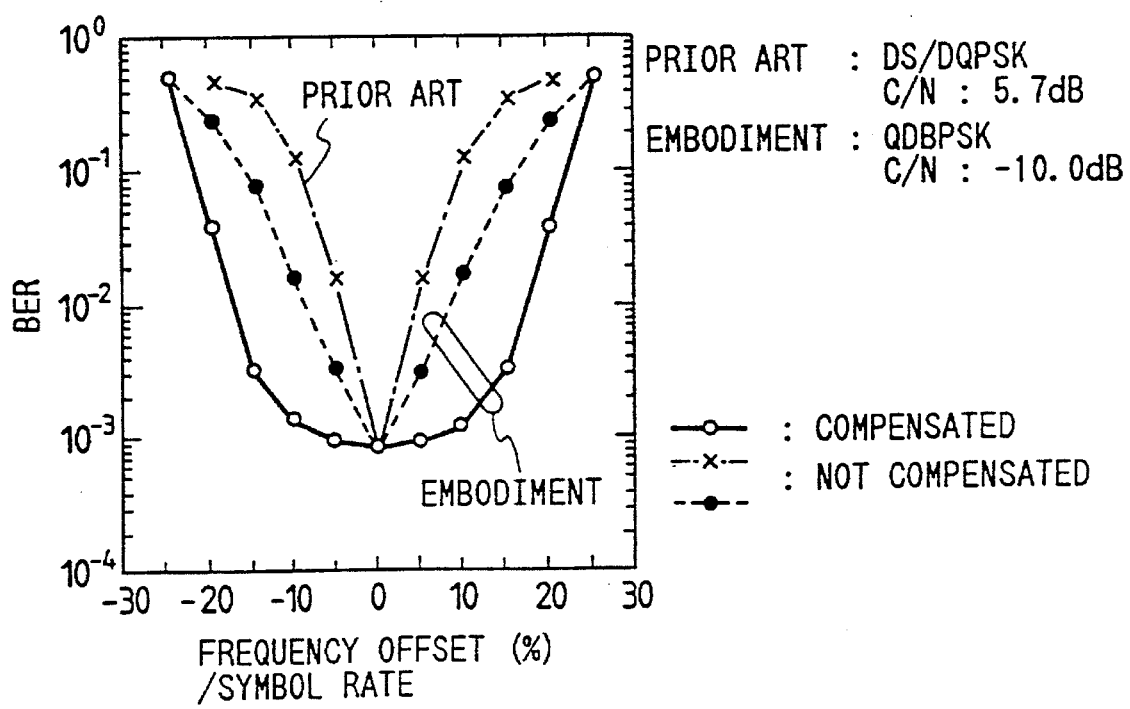
FIG. 19(b) is a graph for showing frequency-offset characteristics of the eleventh embodiment of the present invention.

Turning now to FIGS. 19(a) and 19(b), there are shown examples of characteristics of the system in case of the eleventh embodiment of the present invention. Further, FIG. 19(a) illustrates the characteristics of the system in case that the frequency offset occurring in the DQPSK circuit is not corrected or compensated. In contrast, FIG. 19(b) illustrates the characteristics of the system in case that the frequency offset occurring in the DQPSK circuit is corrected or compensated. As can be seen from these figures, in accordance with the present invention, C/N-BER characteristics are improved in comparison with the conventional system. Further, if the frequency offset compensation is not effected, the system of the present invention can improve the characteristics by nearly one order of each of the values thereof to the frequency offset of ±15% or so (of what is called the symbol rate). Moreover, as can be seen from FIG. 19(b), when the frequency offset compensation is effected, each of the curves representing the BER-characteristics of the embodiment of the present invention becomes almost flat within the range of ±15% of the symbol rate. This proves the effectiveness of the present invention. Furthermore, the configuration of the receiving circuit can be simplified.

Incidentally, in each of the transmitting and receiving circuits of the ninth to twelfth embodiments of the present invention, two local oscillators (namely, the first and second local oscillators) are used. However, apparently, if the number of local oscillators is changed according to the requirement of the communication system.

(Embodiment 13)

Hereinafter, the thirteenth embodiment will be described by referring to FIGS. 20(a), 20(b), 21 and 22. Incidentally, in case of this embodiment, the QPSK method is employed as an example of the M-QPSK modulation method.

Figure 20A:
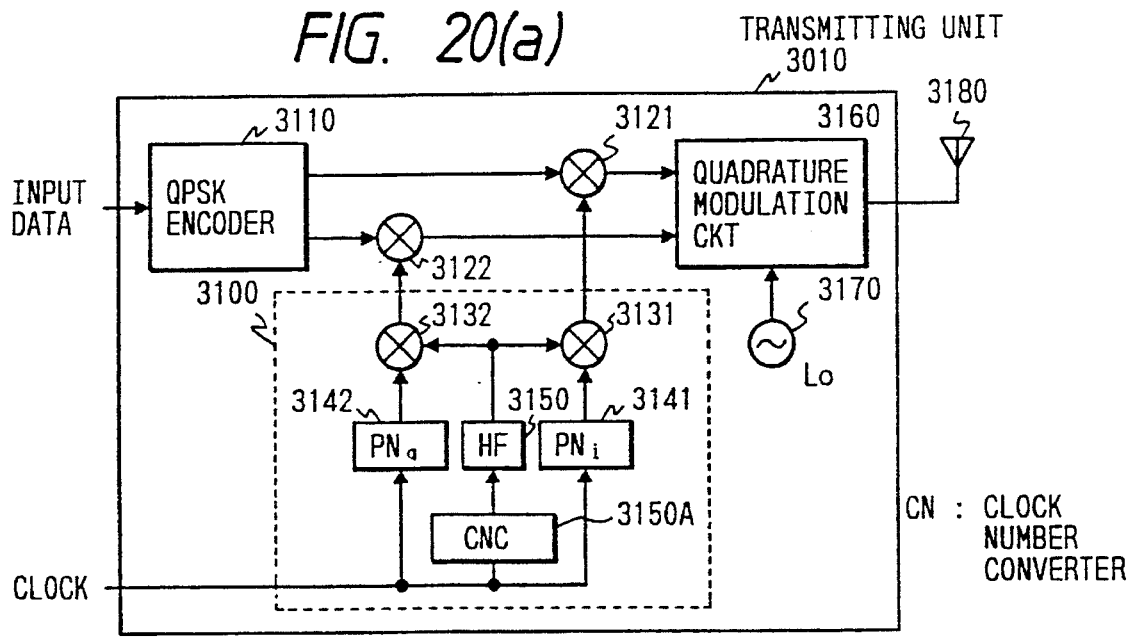
FIG. 20(a) is a schematic block diagram for illustrating the configuration of a transmitting unit of a DS/DPSK system for performing a spreading code generating method according to the present invention (namely, a thirteenth embodiment of the present invention)
Figure 20B:
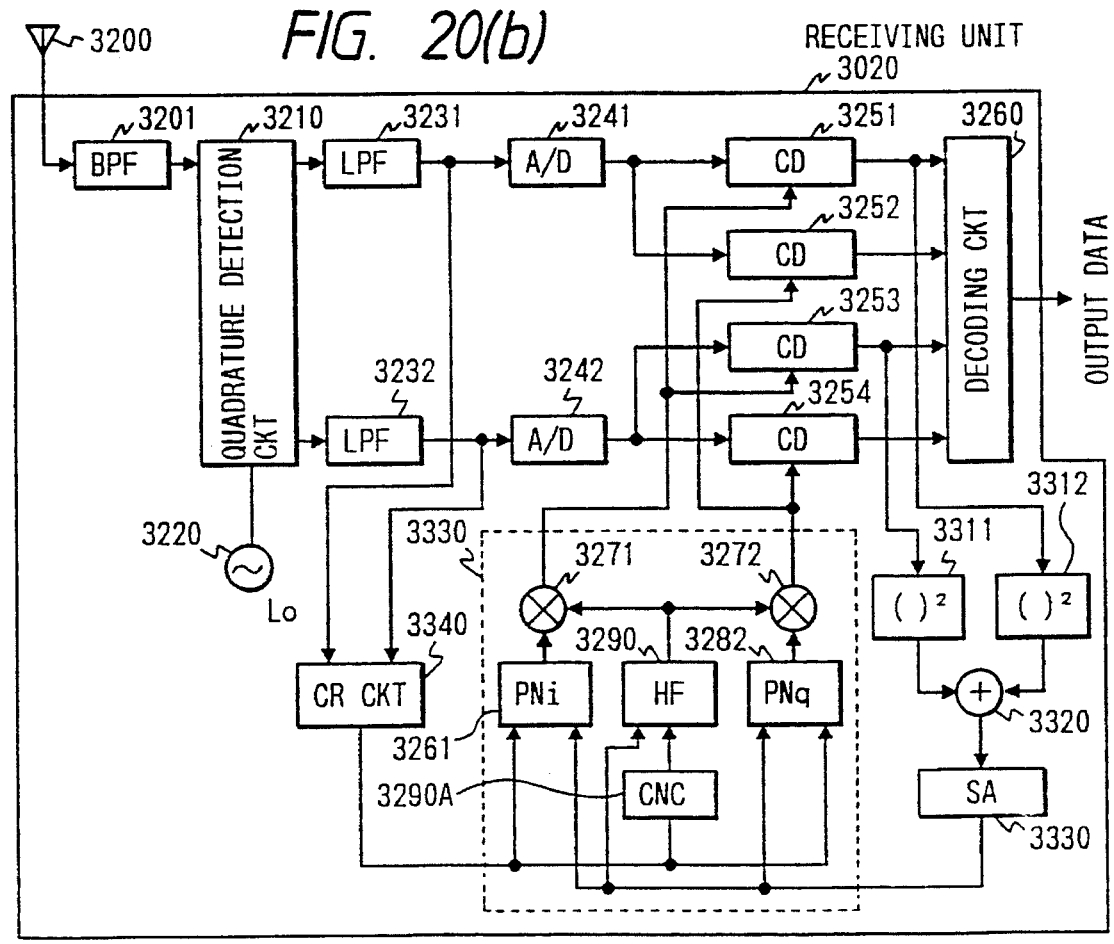
FIG. 20(b) is a schematic block diagram for illustrating the configuration of a receiving unit of the DS/DPSK system of FIG. 20(a)

FIG. 20(a) is a schematic block diagram for illustrating the configuration of a transmitting unit of a DS/DPSK system for performing a spreading code generating method according to the present invention (namely, the thirteenth embodiment of the present invention). FIG. 20(b) is a schematic block diagram for illustrating the configuration of a receiving unit of the DS/DPSK system of FIG. 20(a). For simplicity of drawing, a transmission amplifier and a reception front-end portion are not shown in these figures.

Figure 21:
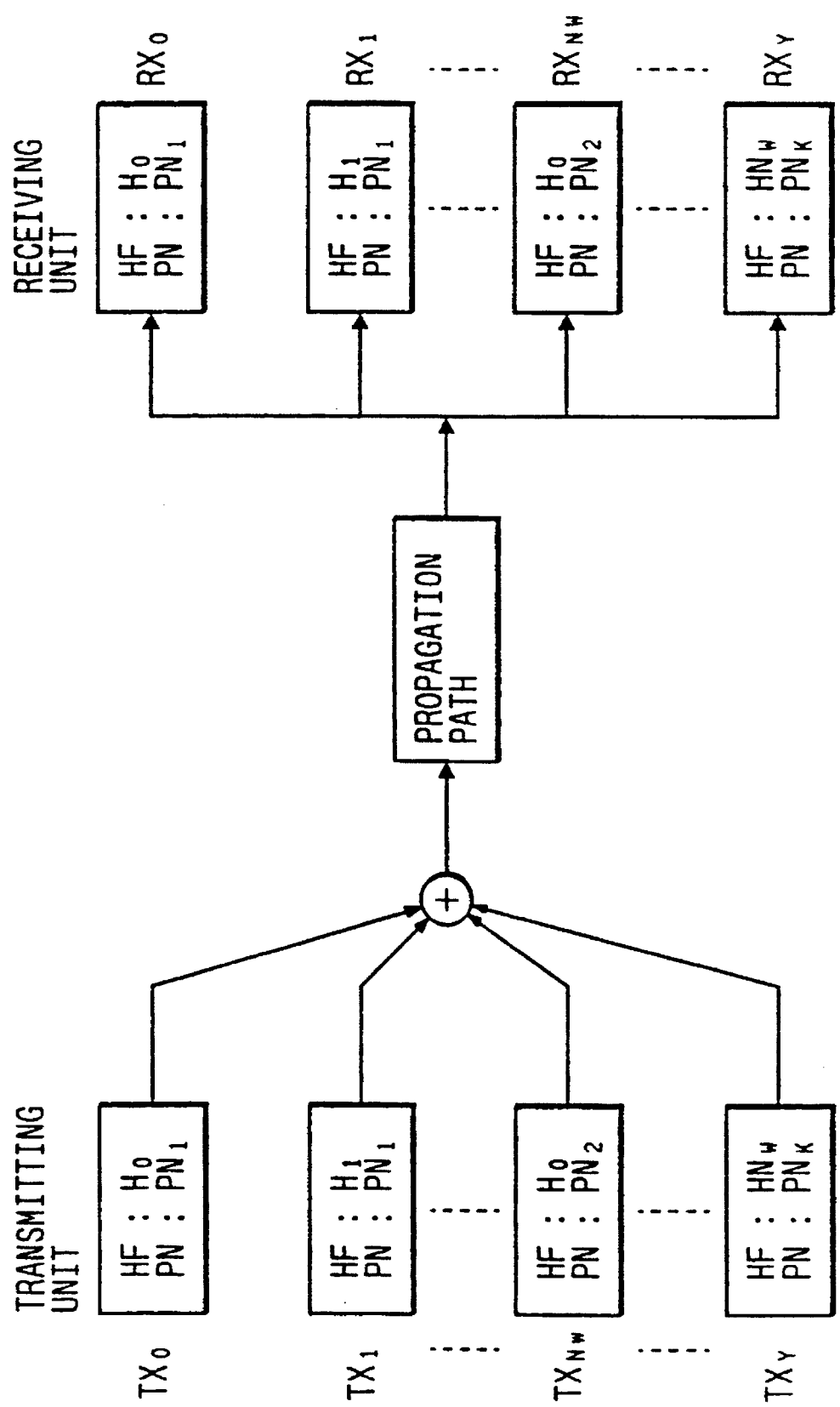
FIG. 21 is a diagram for illustrating the scheme of the DS/DPSK system of FIG. 20(a)
Figure 22:
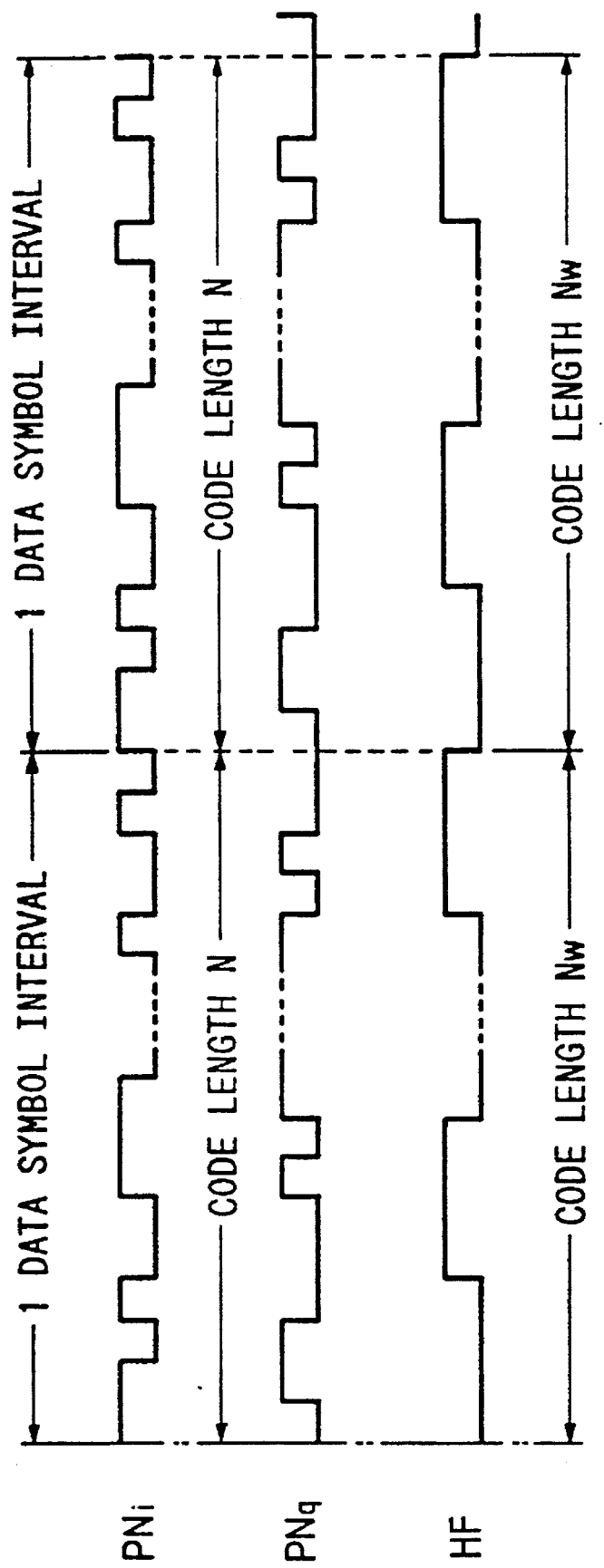
FIG. 22 is a timing chart for illustrating the relation among PN code signals and a Hadamard Function (hereunder abbreviated as HF) signal.

Further, as is shown in FIG. 21, in case of the embodiment of FIGS. 20(a) and 20(b), the spreading rate is N (incidentally, $N=2^n$ (n is an integer larger than 2)). Moreover, an orthogonal code used as a spreading code is Hadamard function code having a code length of $N_w$ (incidentally, $N_w=2^{n-2}$). Furthermore, PN codes used as spreading codes are PNi and PNq, each of which is composed of a code pattern of a period of $2^{n-1}$ and has a code length of $N=2^n$. In FIG. 21, reference characters H0 to HN$_w$ denote code pattern numbers of the HF code; and $PN_1$ to $PN_k$ quadrature spreading code sets, each of which consists of different code patterns corresponding to the in-phase and quadrature components I and Q, respectively. Additionally, FIG. 22 illustrates the code synchronization relation between the PN code and the HF code of the thirteenth embodiment of the present invention.

First, in FIG. 20(a) showing a transmitting unit 3010, reference numeral 3100 designates a spreading code generating portion; 3110 a QPSK encoding circuit for performing a QPSK encoding on input data; 3141 and 3142 PN code generators each for generating PN codes, based on clocks; 3150 an orthogonal code generator for generating an orthogonal code, based on clocks; 3131 a multiplier for multiplying an orthogonal code outputted from the orthogonal code generator 3150 with a PN code outputted from the PN code generator 3141; 3132 a multiplier for multiplying the orthogonal code outputted from the orthogonal code generator 3150 with a PN code outputted from the PN code generator 3142; 3121 a multiplier for multiplying a QPSK code outputted from the QPSK encoding circuit 3110 with an output of the multiplier 3131; 3122 a multiplier for multiplying the QPSK code outputted from the QPSK encoding circuit 3110 with an output of the multiplier 3132; 3160 a quadrature modulation circuit for performing quadrature modulations on each of output signals of the multipliers 3121 and 3122 according to a local signal generated from the local signal source 3170; and 3180 a radio antenna for transmitting an output signal of the quadrature modulation circuit 3160.

In the circuit having the configuration described hereinabove, first, a QPSK encoding is performed on data inputted to the transmitting block or unit 3010 by the QPSK encoding circuit 3110. Then, signal sequences corresponding to the components or channels Ich and Qch are sent to the multipliers 3121 and 3122, respectively. On the other hand, in the spreading code generating portion 3100, the orthogonal code generator 3150 generates HF codes at one-fourth the spreading rate. Moreover, the PN code generators 3141 and 3142 generate different code patterns PNi and PNq at the spreading rate, respectively. Then, the code PNi is multiplied by the HF code in the multiplier 3131 and further the code PNq is multiplied by the HF code in the multiplier 3132 in the manner as illustrated in FIG. 22. Thus, spreading codes are generated. Subsequently, the data corresponding to the channels Ich and Qch, which are sent to the multipliers 3121 and 1322, are spread by using the spreading codes generated in the spreading code generating portion 3100. Then, a quadrature modulation is performed on the spread data in the quadrature modulation portion 3160. Thereafter, resultant signals are transmitted from the radio antenna 3180.

In FIG. 20(b) showing the configuration of the receiving unit 3020, reference numeral 3200 designates a radio antenna for receiving a signal transmitted from the radio antenna 3180 of FIG. 20(a); 3201 a BPF (namely, a bandpass filter); 3210 a quadrature detection circuit for performing a quadrature detection on an output signal of the BPF 3201 on the basis of a local signal generated by a local signal generator 3220; 3231 and 3232 LPFs (namely, low-pass filters); 3241 and 3242 A/D converters converting analog outputs of the LPFs 3231 and 3232 into digital signals, respectively; 3251 to 3254 digital correlators for obtaining the correlations of outputs of the A/D converters 3241 and 3242 by utilizing what is called a sliding correlation (to be described later); 3260 a data decoding circuit for decoding data according to outputs of the LPFs 3231 and 3232; 3340 a clock recovery circuit for recovering clocks of the transmitting unit 3010 from outputs of the correlators 3241 to 3254; 3300 a de-spreading code generating circuit consisting of composing elements designated by the following reference numerals.

Namely, reference numerals 3281 and 3282 denote PN code generators for generating PN codes according to outputs of the clock recovery circuit 3340 and a synchronization acquisition circuit (to be described later); 3290 an orthogonal code generator for generating an orthogonal code according to outputs of the clock recovery circuit 3340 and the synchronization acquisition circuit (to be described later); and 3271 and 3272 modulo-2 multipliers multiplying an orthogonal code outputted by the orthogonal code generator 3290 with the PN codes (namely, PNi and PNq) of the PN code generators 3281 and 3282, respectively.

Meanwhile, reference numerals 3311 and 3312 s squaring devices calculating the squares of output signals of the correlators 3251 and 3253, respectively; 3320 an adder for adding up outputs of the squaring devices 3311 and 3312; and 3330 the synchronization acquisition circuit for performing a synchronization acquisition judgment from an output of the adder 3320.

In the receiving unit 3020 of FIG. 20(b) having the configuration described hereinabove, a DS/QPSK modulation signal generated and transmitted by the transmitting unit 3010 of FIG. 20(a) is received by the radio antenna 3200. Then, a quadrature detection is performed by using a local signal sent from the local signal source 3220 on the received signal inputted to the quadrature detection circuit 3210 through the BPF 3201. Subsequently, signals corresponding to the channels Ich and Qch are outputted from the quadrature detection circuit 3210 in parallel with each other. Further, the signals corresponding to the channels Ich and Qch are inputted through the LPFs 3231 and 3232 to the A/D converters 3241 and 3242, whereupon A/D conversions are performed on signals inputted thereto. Thereafter, outputs of the A/D converters 3241 and 3242 are inputted to the digital correlators 3251 to 3254, as illustrated in FIG. 20(b).

In case of this embodiment, each of the digital correlators 3251 to 3254 calculates what is called a sliding correlation. Further, in order to cope with the "phase rotation" occurring due to the frequency offset, these four correlators are used. Moreover, a synchronization acquisition judgment is performed by the synchronization acquisition judgment circuit 3330 by using the squares off outputs of the correlators 3251 and 3253. Namely, the code patterns are circulated and are synchronized with each other in case where the cross correlation therebetween becomes minimum.

Further, the de-spreading code generating circuit 3300 is similar to the spreading code generating portion 3100 of the transmitting unit 3010, except that the synchronization acquisition circuit 3300 controls the timing of each de-spreading code generation.

Incidentally, in case of this embodiment, the code length of the PN code is the quadruple of the code length of the HF code. Further, the clock rates of input clocks to the orthogonal code generator 3150 and 3290 are reduced by a factor of four by using the clock number converters 3150A and 3290A, respectively. However, as long as $N \geq N_w$, any other ratio for changing the clock rate of an input clock may be employed.

As the result of constructing the transmitting unit 3010 and the receiving unit 3020 as above described, the spreading code can be generated by utilizing the characteristics of the PN codes and the HF code. Moreover, the degree of multiplexing can be increased.

(Embodiment 14)

Hereinafter, the fourteenth embodiment of the present invention, which employs the DS/QPSK method, will be described by referring to FIGS. 23 to 25.

FIG. 23 is a diagram for illustrating patterns of codes employed in the DS/QPSK system for performing a spreading code generating method according to the present invention (namely, the fourteenth embodiment of the present invention) in case where a 7-stage M-code having a code length of 127 is employed. Namely, this figure shows the code patterns obtained by using 9 symbols or elements $C_1$ to $C_9$ of the 7-stage M-code. Further, the state of the code pattern of this figure is assumed to be a state in which there is no phase offset (namely, all of initial values of registers of the code generator).

FIG. 25 is a diagram for illustrating maximum values of the cross correlations between the code patterns of FIG. 23. As is seen from FIG. 25, a maximum value of the cross correlation of a code pattern varies with the code pattern (see the maximum values of, for instance, the cross correlation between elements $C_1$ and $C_5$ and the cross correlation between elements $C_1$ and $C_7$ of FIG. 25) even if the code patterns are obtained from elements of the same M-code. Thus, the code patterns (namely, the combinations of elements, for example, ($C_1$–$C_5$), ($C_2$–$C_6$), ($C_3$–$C_7$), ($C_4$–$C_8$)) having large maximum values of the correlations thereof are used as quadrature spreading code sets corresponding to the in-phase channel Ich and the quadrature channel Qch. In case of each of the code patterns or sets, a phase offset is caused in one of the elements thereof such that the cross correlation of each of the code sees or patterns has a minimum value. FIG. 24 is a diagram for illustrating practical examples of quadrature spreading code sets or patterns generated in the fourteenth embodiment of the present invention. For example, in case of the quadrature spreading code set ($C_1$–$C_5$), phase offsets are caused in seven chip (codes) of the element $C_5$ and as a consequence the cross correlation between these two elements becomes equal to 1.

As described above, in case of this embodiment, code patterns having large cross correlations thereof are used as quadrature spreading codes. Further, an phase offset is caused in the code patterns. Thereby, even if the in-phase channel or component Ich is not completely separated from the quadrature component Qch in the receiving unit or station, the interference between these components can be made to be small. Moreover, the cross correlation therebetween can be made to be relatively small. Furthermore, even when one of the channels is interfered, the other channel can be detected. Consequently, in comparison with the conventional system, the possibility of an occurrence of malfunction can be reduced.

While the preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A digital correlator comprising:

non-inverting-or-inverting amplifier for receiving a signal obtained by a direct sequence type spread spectrum communication, for converting the received signal into a baseband signal and for inverting or not inverting a polarity of the received signal according to a polarity of a spreading code signal;

an analog-to-digital converter for performing an analog-to-digital conversion on an output of the non-inverting-or-inverting amplifier;

an integrator for integrating a digital signal obtained as a result of the analog-to-digital conversion performed by the analog-to-digital converter; and a squaring device for calculating a square of an output of the integrator and for outputting data representing a correlation according to the calculated square of the output of the integrator.

2. A digital correlator comprising:

an analog-to-digital converter for receiving a signal obtained by a direct sequence type spread spectrum communication, for converting the received signal into a baseband signal and for performing an analog-to-digital conversion on the baseband signal;

a signal processing circuit for changing a polarity of a digital signal obtained as a result of the analog-to-digital conversion performed by the analog-to-digital converter according to a polarity of a spreading code signal;

an integrator for integrating an output of the signal processing circuit; and a squaring device for calculating a square of an output of the integrator and for outputting data representing a correlation according to the calculated square of the output of the integrator.

3. A digital correlator comprising:

a first analog-to-digital converter for receiving an input signal obtained by a direct sequence type spread spectrum communication, for converting the input signal into a first baseband signal and for performing an analog-to-digital conversion for the first baseband signal to obtain a first converted signal;

an inverting amplifier having a gain of 1 for receiving the input signal obtained by the direct sequence type spread spectrum communication and for changing a polarity of the input signal;

a second analog-to-digital converter for converting the input signal of which the polarity is changed by the inverting amplifier into a second baseband signal and for performing an analog-to-digital conversion for the second baseband signal to obtain a second converted signal;

selecting means for selecting the first converted signal obtained by the first analog-to-digital converter or the second converted signal obtained by the second analog-to-digital converter while changing the selection of the first or second converted signal according to a polarity of a spreading code signal and obtaining a correlation signal by serially connecting the first and second converted signals selected;

an integrator for integrating the correlation signal obtained by the selecting means to obtain an integrated correlation signal; and a squaring device for calculating a square of the integrated correlation signal obtained by the integrator and for outputting the square of the integrated correlation signal as a correlation between the input signal and the spreading code signal.

4. A digital correlator comprising:

an analog-to-digital converter for receiving a signal obtained by a direct sequence type spread spectrum communication, for converting the received signal into a baseband signal and for performing an analog-to-digital conversion on the baseband signal;

a first integrator for integrating an output of the analog-to-digital signal when a polarity of a spreading code signal is positive;

a second integrator for integrating the output of the analog-to-digital signal when the polarity of the spreading code signal is negative;

an adder for calculating a difference between outputs of the first and second integrators;

a squaring device for calculating a square of an output of the adder and for outputting data representing a correlation according to the calculated square of the output of the adder.

5. A digital correlator comprising:

an analog-to-digital converter for receiving a signal obtained by a direct sequence type spread spectrum communication, for converting the received signal into a baseband signal and for performing an analog-to-digital conversion on the baseband signal;

an integrator for integrating outputs of the analog-to-digital converter by addition or subtracting the outputs of the analog-to-digital converter according to a polarity of a spreading code signal; and a squaring device for calculating a square of an output of the integrator and for outputting data representing a correlation according to the calculated square of the output of the integrator.

6. A digital correlation detecting circuit comprising:

in-phase component extracting means for extracting an in-phase component from an input signal;

first non-inverting-or-inverting amplifier for converting the in-phase component of the input signal extracted by the in-phase component extracting means into an in-phase baseband signal and for inverting or not inverting a polarity of the in-phase baseband signal according to a polarity of an inphase component of a spreading code signal to obtain an in-phase correlation signal;

a first analog-to-digital converter for performing an analog-to-digital conversion for the in-phase correlation signal obtained by the first non-inverting-or-inverting amplifier to obtain a converted in-phase correlation signal;

a first integrator for integrating the converted in-phase correlation signal obtained by the first analog-to-digital converter to obtain an integrated in-phase correlation signal;

a first square device for calculating a square of the integrated in-phase correlation signal obtained by the first integrator to obtain the square of the integrated in-phase correlation signal as an in-phase correlation between the in-phase component of the input signal and the in-phase component of the spreading code signal;

quadrature component extracting means for extracting a quadrature component from the input signal;

second non-inverting-or-inverting amplifier for converting the quadrature component of the input signal extracted by the quadrature component extracting means into a quadrature baseband signal and for inverting or not inverting a polarity of the quadrature baseband signal according to a polarity of a quadrature component of the spreading code signal to obtain a quadrature correlation signal;

a second analog-to-digital converter for performing an analog-to-digital conversion for the quadrature correlation signal obtained by the second non-inverting-or-inverting amplifier to obtain a converted quadrature correlation signal; a second integrator for integrating the converted quadrature correlation signal obtained by the second analog-to-digital converter to obtain an integrated quadrature correlation signal;

a second square device for calculating a square of the integrated quadrature correlation signal obtained by the second integrator to obtain the square of the integrated quadrature correlation signal as a quadrature correlation between the quadrature component of the input signal and the quadrature component of the spreading code signal; and an adder for adding the in-phase correlation obtained by the first square device and the quadrature correlation obtained by the second square device to obtain a correlation between the input signal and the spreading code signal.

7. A digital correlation detecting circuit comprising:

in-phase component extracting means for extracting an in-phase component from an input signal;

a first analog-to-digital converter for converting the in-phase component of the input signal into an in-phase component of an in-phase baseband signal and for performing an analog-to-digital conversion for the in-phase baseband signal to obtain a converted in-phase baseband signal;

a first signal processing circuit for changing a polarity of the converted in-phase baseband signal obtained by the first analog-to-digital converter according to a polarity of an in-phase component of a spreading code signal to obtain an in-phase correlation signal;

a first integrator for integrating the in-phase correlation signal obtained by the first signal processing circuit to obtain an integrated in-phase correlation signal; and a first square device for calculating a square of the integrated in-phase correlation signal obtained by the first integrator to obtain the square of the integrated in-phase correlation signal as an in-phase correlation between the inphase component of the input signal and the in-phase component of the spreading code signal;

quadrature component extracting means for extracting a quadrature component from the input signal;

a second analog-to-digital converter for converting the quadrature component of the input signal into a quadrature component of a quadrature baseband signal and for performing an analog-to-digital conversion for the quadrature baseband signal to obtain a converted quadrature baseband signal;

a second signal processing circuit for changing a polarity of the converted quadrature baseband signal obtained by the second analog-to-digital converter according to a polarity of an quadrature component of the spreading code signal to obtain a quadrature correlation signal;

a second integrator for integrating the quadrature correlation signal obtained by the second signal processing circuit to obtain an integrated quadrature correlation signal; and a second square device for calculating a square of the integrated quadrature correlation signal obtained by the second integrator to obtain the square of the integrated quadrature correlation signal as a quadrature correlation between the quadrature component of the input signal and the quadrature component of the spreading code signal; and an adder for adding the in-phase correlation obtained by the first square device and the quadrature correlation obtained by the second square device to obtain a correlation between the input signal and the spreading code signal.

8. A digital correlation detecting circuit comprising:

in-phase component extracting means for extracting an in-phase component from an input signal;

a first analog-to-digital converter for receiving the in-phase component of the input signal obtained by the in-phase component extracting means, for converting the in-phase component of the input signal into a first in-phase baseband signal and for performing an analog-to-digital conversion for the first in-phase baseband signal to obtain a first converted in-phase baseband signal;

an in-phase inverting amplifier having a gain of 1 for receiving the in-phase component of the input signal obtained by the in-phase component extracting means and for changing a polarity of the in-phase component of the input signal; a second analog-to-digital converter for converting the inphase component of the input signal of which the polarity is changed by the in-phase inverting amplifier into a second inphase baseband signal and for performing an analog-to-digital conversion for the second in-phase baseband signal to obtain a second converted in-phase baseband signal;

in-phase selecting means for selecting the first converted in-phase baseband signal obtained by the first analog-to-digital converter or the second converted in-phase baseband signal obtained by the second analog-to-digital converter while changing the selection of the first or second converted in-phase baseband signal according to a polarity of an inphase component of a spreading code signal and obtaining an in-phase correlation signal by serially connecting the first and second converted in-phase baseband signals selected:

an in-phase integrator for integrating the in-phase correlation signal obtained by the in-phase selecting means to obtain an integrated in-phase correlation signal;

an in-phase squaring device for calculating a square of the integrated in-phase correlation signal obtained by the inphase integrator and for outputting the square of the integrated in-phase correlation signal as an in-phase correlation between the in-phase component of the input signal and the in-phase component of the spreading code signal;

quadrature component extracting means for extracting an quadrature component from the input signal;

a third analog-to-digital converter for receiving the quadrature component of the input signal obtained by the quadrature component extracting means, for converting the quadrature component of the input signal into a first quadrature baseband signal and for performing an analog-to-digital conversion for the first quadrature baseband signal to obtain a first converted quadrature baseband signal;

a quadrature inverting amplifier having a gain of 1 for receiving the quadrature component of the input signal obtained by the quadrature component extracting means and for changing a polarity of the quadrature component of the input signal;

a fourth analog-to-digital converter for converting the quadrature component of the input signal of which the polarity is changed by the quadrature inverting amplifier into a second quadrature baseband signal and for performing an analog-to-digital conversion for the second quadrature baseband signal to obtain a second converted quadrature baseband signal: quadrature selecting means for selecting the first converted quadrature baseband signal obtained by the third analog-to-digital converter or the second converted quadrature baseband signal obtained by the fourth analog-to-digital converter while changing the selection of the first or second converted quadrature baseband signal according to a polarity of a quadrature component of the spreading code signal and obtaining a quadrature correlation signal by serially connecting the first and second converted quadrature baseband signals selected;

a quadrature integrator for integrating the quadrature correlation signal obtained by the quadrature selecting means to obtain an integrated quadrature correlation signal;

a quadrature squaring device for calculating a square of the integrated quadrature correlation signal obtained by the quadrature integrator and for outputting the square of the integrated quadrature correlation signal as a quadrature correlation between the quadrature component of the input signal and the quadrature component of the spreading code signal; and an adder for adding the in-phase correlation obtained by the in-phase squaring device and the quadrature correlation obtained by the quadrature squaring device to obtain a correlation between the input signal and the spreading code signal.

9. A digital correlation detecting circuit comprising:

in-phase component extracting means for extracting an in-phase component from an input signal;

a first analog-to-digital converter for converting the in-phase component of the input signal into an in-Phase baseband signal and for performing an analog-to-digital conversion for the in-phase baseband signal to obtain a converted in-phase baseband signal;

a first integrator for integrating the converted in-phase baseband signal obtained by the first analog-to-digital converter in cases where a polarity of an in-phase component of a spreading code signal is positive and obtaining a first in-phase correlation signal;

a second integrator for integrating the converted in-phase baseband signal obtained by the first analog-to-digital converter in cases where the polarity of the in-phase component of the spreading code signal is negative and obtaining a second in-phase correlation signal;

an in-phase adder for calculating an in-phase difference between the first in-phase correlation signal obtained by the first integrator and the second in-phase correlation signal obtained by the second integrator;

an in-phase squaring device for calculating a square of the in-phase difference calculated by the in-phase adder to obtain the square of the in-phase difference as an in-phase correlation between the in-phase component of the input signal and the in-phase component of the spreading code signal; quadrature component extracting means for extracting a quadrature component from the input signal;

a second analog-to-digital converter for converting the quadrature component of the input signal into an quadrature baseband signal and for performing an analog-to-digital conversion for the quadrature baseband signal to obtain a converted quadrature baseband signal; a third integrator for integrating the converted quadrature baseband signal obtained by the second analog-to-digital converter in cases where a polarity of a quadrature component of the spreading code signal is positive and obtaining a first quadrature correlation signal;

a fourth integrator for integrating the converted quadrature baseband signal obtained by the second analog-to-digital converter in cases where the polarity of the quadrature component of the spreading code signal is negative and obtaining a second quadrature correlation signal;

an quadrature adder for calculating an quadrature difference between the first quadrature correlation signal obtained by the third integrator and the second quadrature correlation signal obtained by the fourth integrator;

an quadrature squaring device for calculating a square of the quadrature difference calculated by the quadrature adder to obtain the square of the quadrature difference as an quadrature correlation between the quadrature component of the input signal and the quadrature component of the spreading code signal; and an adder for adding the in-phase correlation obtained by the in-phase squaring device and the quadrature correlation obtained by the quadrature squaring device to obtain a correlation between the input signal and the spreading code signal.

10. A digital correlation detecting circuit comprising:

in-phase component extracting means for extracting an in phase component from an input signal: a first analog-to-digital converter for converting the inphase component of the input signal into an in-phase baseband signal and for performing an analog-to-digital conversion for the in-phase baseband signal to obtain a converted in-phase baseband signal;

a first integrator for integrating the converted in-phase baseband signal obtained by the first analog-to-digital converter while adding the converted in-phase baseband signal in cases where a polarity of an in-phase component of a spreading code signal is positive and subtracting the converted in-phase baseband signal in cases where the polarity of the in-phase component of the spreading code signal is negative and for obtaining an in-phase correlation signal; a first squaring device for calculating a square of the inphase correlation signal of the first integrator to obtain the square of the in-phase correlation signal as an in-phase correlation between the in-phase component of the input signal and the in-phase component of the spreading code signal: quadrature component extracting means for extracting an quadrature component from the input signal: a second analog-to-digital converter for converting the quadrature component of the input signal into an quadrature baseband signal and for performing an analog-to-digital conversion for the quadrature baseband signal to obtain a converted quadrature baseband signal: a second integrator for integrating the converted quadrature baseband signal obtained by the second analog-to-digital converter while adding the converted quadrature baseband signal in cases where a polarity of an quadrature component of the spreading code signal is positive and subtracting the converted quadrature baseband signal in cases where the polarity of the quadrature component of the spreading code signal is negative and for obtaining an quadrature correlation signal;

a second squaring device for calculating a square of the quadrature correlation signal of the second integrator to obtain the square of the quadrature correlation signal as an quadrature correlation between the quadrature component of the input signal and the quadrature component of the spreading code signal; and an adder for adding the in-phase correlation obtained by the first squaring device and the quadrature correlation obtained by the second squaring device to obtain a correlation between the input signal and the spreading code signal.

* * * * *